(12) United States Patent
Sauer et al.

(10) Patent No.: US 11,838,520 B2
(45) Date of Patent: Dec. 5, 2023

(54) DEVICES AND METHODS FOR CODING A PICTURE BY PARTITIONING IT INTO SLICES COMPRISING TILES

(71) Applicant: Huawei Technologies Co., Ltd., Shenzhen (CN)

(72) Inventors: Johannes Sauer, Aachen (DE); Ye-Kui Wang, San Diego, CA (US); Zhijie Zhao, Munich (DE); Semih Esenlik, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 270 days.

(21) Appl. No.: 17/360,805

(22) Filed: Jun. 28, 2021

(65) Prior Publication Data

US 2022/0132144 A1   Apr. 28, 2022

Related U.S. Application Data

(63) Continuation of application No. PCT/CN2019/127366, filed on Dec. 23, 2019.
(Continued)

(30) Foreign Application Priority Data

Jun. 21, 2019   (EP) .................................... 19181873

(51) Int. Cl.
*H04N 19/174* (2014.01)
*H04N 19/119* (2014.01)
*H04N 19/172* (2014.01)

(52) U.S. Cl.
CPC ......... *H04N 19/174* (2014.11); *H04N 19/119* (2014.11); *H04N 19/172* (2014.11)

(58) Field of Classification Search
CPC .......................... H04N 19/174; H04N 19/119
See application file for complete search history.

(56) References Cited

U.S. PATENT DOCUMENTS

2015/0201202 A1   7/2015   Hattori
2017/0347109 A1   11/2017  Hendry et al.
(Continued)

FOREIGN PATENT DOCUMENTS

CN   103947213 A   7/2014
CN   104584555 A   4/2015
(Continued)

OTHER PUBLICATIONS

Bross et al., "Versatile Video Coding (Draft 2)," hJoint Video Experts Team (JVET) of ITU-T SG 16 WP 3 and ISO/IEC JTC 1/SC 29/WG 11, 11th Meeting: Ljubljana, SI, Document: JVET-K1001-v5, total 145 pages (Jul. 10-18, 2018).
(Continued)

*Primary Examiner* — Jerry T Jean Baptiste
(74) *Attorney, Agent, or Firm* — Leydig, Voit & Mayer, Ltd.

(57) ABSTRACT

A device for encoding and a device for decoding a picture, respectively, and corresponding methods relating to the field of picture coding are provided. The devices are respectively configured to partition the picture into one or more slices, each slice comprising one or more tiles, and one or more slices holding coded picture data. Further, the devices are configured to encode the one or more slices holding coded picture data, thereby improving coding and decoding of pictures with uncoded buffer space.

21 Claims, 16 Drawing Sheets

Related U.S. Application Data

(60) Provisional application No. 62/786,321, filed on Dec. 28, 2018.

(56) References Cited

U.S. PATENT DOCUMENTS

| | | | | |
|---|---|---|---|---|
| 2018/0199049 A1* | 7/2018 | Esenlik | ............... | H04N 19/176 |
| 2018/0367798 A1 | 12/2018 | Horowitz | | |
| 2020/0351510 A1* | 11/2020 | Morishige | ............ | H04N 19/174 |

FOREIGN PATENT DOCUMENTS

| | | |
|---|---|---|
| CN | 107509082 A | 12/2017 |
| EP | 2285112 A1 | 2/2011 |
| WO | 2018066988 A1 | 4/2018 |

OTHER PUBLICATIONS

Ye et al., "Algorithm descriptions of projection format conversion and video quality metrics in 360Lib Version 8," Joint Video Exploration Team (JVET) of ITU-T SG 16 WP 3 and ISO/IEC JTC 1/SC 29/WG 11, 12th Meeting: Macau, CN, Document: JVET-L1004, total 46 pages (Oct. 3-12, 2018).

Bross et al., "Versatile Video Coding (Draft 5)," Joint Video Experts Team (JVET) of ITU-T SG 16 WP 3 and ISO/IEC JTC 1/SC 29/WG 11, 14th Meeting: Geneva, CH, Document: JVET-N1001-v6, total 384 pages (Mar. 19-27, 2019).

"Series H: Audiovisual and Multimedia Systems, Infrastructure of audiovisual services—Coding of moving video, Advanced video coding for generic audiovisual services," ITU-T H.264 (Apr. 2017), total 812 pages, International Telecommunication Union, Geneva, Switzerland (Apr. 2017).

"Series H: Audiovisual and Multimedia Systems Infrastructure of audiovisual services—Coding of moving video, High efficiency video coding," ITU-T H.265 (Feb. 2018), total 692 pages, International Telecommunication Union, Geneva, Switzerland (Feb. 2018).

Sauer et al., "Coding of 360° video in non-compact cube layout using uncoded areas," Joint Video Experts Team (JVET) of ITU-T SG 16 WP 3 and ISO/IEC JTC 1/SC 29/WG 11,16th Meeting: Geneva, CH, Document: JVET-P0316-v1, Total 6 pages (Oct. 1-11, 2019).

Sauer et al., "Geometry padding for cube based 360 degree video using uncoded areas," Joint Video Experts Team (JVET) of ITU-T SG 16 WP 3 and ISO/IEC JTC 1/SC 29/WG 11, 15th Meeting: Gothenburg, SE, Document: JVET-O0487-v1, Total 9 pages (Jul. 3-12, 2019).

Hanhart et al., "AHG8: High level syntax extensions for signaling of 360-degree video information," Joint Video Exploration Team (JVET) of ITU-T SG 16 WP 3 and ISO/IEC JTC 1/SC 29/WG 11, 4th Meeting: Chengdu, CN, Document: JVET-D0093, Total 6 pages (Oct. 15-21, 2016).

\* cited by examiner

DEVICES AND METHODS FOR CODING A PICTURE BY PARTITIONING IT INTO SLICES COMPRISING TILES

CROSS-REFERENCE TO RELATED APPLICATIONS

This application is a continuation of International Application No. PCT/CN2019/127366, filed on Dec. 23, 2019, which claims priority to United States of America Patent Application No. 62/786,321, filed on Dec. 28, 2018 and European Patent Application No. 19181873.1, filed on Jun. 21, 2019. The disclosures of the aforementioned applications are hereby incorporated by reference in their entireties.

TECHNICAL FIELD

Embodiments of the present disclosure relate to the field of picture coding (comprising encoding and decoding). Particularly, embodiments of the disclosure relate to improving the encoding and decoding of a picture. To this end, embodiments of the disclosure present a device for encoding a picture, and a device for decoding a picture, as well as corresponding methods and computer programs. The devices and methods are configured to partition the picture into one or more slices, wherein each slice comprises one or more tiles, and encode, at least, slices holding coded picture data. Embodiments of the devices and methods may be applicable to 360-degree (360°) video picture(s).

BACKGROUND

As an example, 360-degree video or spherical video is a way of experiencing immersive video using devices such as head-mounted displays (HMD). This technique can provide an immersive "being there" experience for consumers by capturing a full panoramic view of the world. 360-degree video is typically recorded using a special rig of multiple cameras, or using a dedicated virtual reality (VR) camera that contains multiple embedded camera lenses. The resulting footage is then stitched to form a single video. This process may be done by the camera itself, or by using video editing software that can analyze common visuals to synchronize and link the different camera feeds together to represent the full viewing sphere surrounding the camera rig. Essentially, the camera or the camera system maps a 360-degree scene onto a sphere.

The stitched image (i.e. the image on the surface of the sphere) is then mapped (or unfolded) from spherical into a two-dimensional (2D) rectangular representation based on projection (such as equirectangular projection), and then encoded using e.g., standard video codecs. At the viewing end, after decoding the video is mapped onto a virtual sphere with the viewer located at the center of the virtual sphere. The viewer can navigate inside the virtual sphere to see a view of the 360-degree world as desired and thereby have an immersive experience.

As mentioned, for coding of 360-degree videos a projection of the content to a 2D representation is necessary. In addition to equirectangular projection, possible projections include projection to faces of a cube, octahedron, or the like. This introduces discontinuities, e.g., at borders or boundaries of frames, and in some cases at borders or boundaries of faces (such as faces of a cube or the like). Thereby, the smoothness of content across such borders is typically not preserved during coding. When the (de)coded video is rendered to a viewport, artifacts commonly appear at the seams of the reconnected borders. These artifacts can disturb the viewing experience.

SUMMARY

Embodiments of the present application provide devices (or apparatuses) and methods for encoding and decoding according to the independent claims.

The foregoing and other objects are achieved by the subject matter of the independent claims. Further implementation forms are apparent from the dependent claims, the description and the figures.

A first aspect of this disclosure relates to a device for encoding a picture, wherein the device is configured to: partition the picture into one or more slices, each slice comprising one or more tiles, and one or more slices holding coded picture data; and encode the one or more slices holding coded picture data.

Generally, in this disclosure, "coded picture data" means that it contains the data that represents the values of the samples in the (video) picture. In particular, the one or more slices holding coded picture data may hold data that represents the values of the samples in the picture. Non-coded picture data contains information, which may enhance usability of the coded picture data, but are not directly necessary for decoding the values of the samples in the video pictures. The one or more slices not holding coded picture data may hold non-coded picture data.

The device of the first aspect provides improved encoding of the picture.

In an implementation form of the first aspect, the one or more slices holding coded picture data form a subpicture, the subpicture covering a rectangular region of the picture.

Rectangular slices/regions can be of advantage when the video consists of different views and the decoding device is only interested in a subset. If dependencies (Inter prediction) between the slices are avoided, the decoding devices has only to decode the desired subset. This is particularly useful for 360 video, where a user only looks at a part of the video at a given time.

In an implementation form of the first aspect, if at least one tile in a given slice holds coded picture data, the whole given slice holds coded picture data.

Slices may have a high level entry point, and each slice may be in a separate Network Abstraction Layer (NAL) unit. This makes them the suitable syntax elements for introducing, for example, uncoded areas. In particular, the one or more slices not holding coded picture data may form one or more uncoded areas. Since subpictures may be a set of slices, they are suitable as well. The smaller the unit for introducing uncoded areas (i.e. tiles, CTUs), the larger the overhead of the additional signaling may be.

In an implementation form of the first aspect, the one or more slices are formed rectangular.

In an implementation form of the first aspect, the picture is partitioned into a plurality of slices, and one or more slices do not hold coded picture data.

These slices may be used for various applications, e.g. geometry padding, or in order to provide side information regarding the picture (en)coding.

In an implementation form of the first aspect, if at least one tile in a given slice does not hold coded picture data, the whole given slice does not hold coded picture data.

The created uncoded areas/slices may be used for various applications. Using uncoded areas/slices has the advantage that the size of the Reference Picture List (RPL) stays constant, since each pictures consists of the coded/uncoded areas which belong together.

In an implementation form of the first aspect, the one or more slices not holding coded picture data hold padding data for geometry padding.

In an implementation form of the first aspect, the one or more slices not holding coded picture data hold slice header data.

In an implementation form of the first aspect, the device is further configured to disable in-loop filters at boundaries of slices not holding coded picture data.

In an implementation form of the first aspect the picture is a picture of a 360° video.

In an implementation form of the first aspect, wherein the picture is a 360° video, the device is further configured to: reconstruct samples of the picture of the 360° video in accordance with a projection format to obtain a set of 2D faces, wherein each 2D face is formed by one or more slices holding coded picture data.

In an implementation form of the first aspect, at least a left boundary and a top boundary of a subpicture, respectively, is a boundary to a slice not holding coded picture data or is a boundary to another subpicture or is a picture boundary.

In an implementation form of the first aspect, the device is configured to encode the one or more slices not holding coded picture data.

A second aspect of this disclosure relates to a device for decoding a picture, wherein the device is configured to partition the picture into one or more slices, each slice comprising one or more tiles, and one or more slices holding coded picture data; and decode the one or more slices holding coded picture data.

The device of the second aspect provides improved decoding of the picture. In particular, the implementation forms of the second aspect achieve the same advantages as the implementation forms of the first aspect.

In an implementation form of the second aspect, one or more slices holding coded picture data form a subpicture, covering a rectangular region of the picture.

In an implementation form of the second aspect, if at least one tile in a given slice holds coded picture data, the whole given slice holds coded picture data.

In an implementation form of the second aspect, the one or more slices are formed rectangular.

In an implementation form of the second aspect, the picture is partitioned into a plurality of slices, and one or more slices do not hold coded picture data.

In an implementation form of the second aspect, if at least one tile in a given slice does not hold coded picture data, the whole given slice does not hold coded picture data.

In an implementation form of the second aspect, the one or more slices not holding coded picture data hold padding data for geometry padding.

In an implementation form of the second aspect, the one or more slices not holding coded picture data hold slice header data.

In an implementation form of the second aspect, the device is configured to receive, from a device for encoding the picture, information about a reserved buffer space for the picture in a picture buffer; wherein the reserved buffer space does not hold coded picture data.

However, it is also possible that the reserved buffer space holds coded picture data.

In an implementation form of the second aspect, the device is configured to receive information from a device for encoding the picture, wherein the one or more slices not holding coded picture data are omitted from the information for the decoding.

In an implementation form of the second aspect, the device is configured to disable in-loop filters at boundaries of slices not holding coded picture data.

In an implementation form of the second aspect, the picture is a picture of a 360° video.

In an implementation form of the second aspect, wherein the picture is a picture of a 360° video, the device is further configured to: reconstruct samples of the picture of the 360° video in accordance with a projection format to obtain a set of 2D faces, wherein each 2D face is formed by one or more slices holding coded picture data.

In an implementation form of the second aspect, at least a left boundary and a top boundary of a subpicture, respectively, is a boundary to a slice not holding coded picture data or is a boundary to another subpicture or is a picture boundary.

A third aspect of this disclosure relates to a method for encoding a picture, wherein the method comprises: partitioning the picture into one or more slices, each slice comprising one or more tiles, and one or more slices holding coded picture data; and encoding the one or more slices holding coded picture data.

The method of the third aspect may have further features and implementation forms corresponding to the features and implementation forms of the device of the first aspect.

A fourth aspect of this disclosure relates to a method for decoding a picture, wherein the method comprises: partitioning the picture into one or more slices, each slice comprising one or more tiles, and one or more slices holding coded picture data; and decoding the one or more slices holding coded picture data.

The method of the fourth aspect may have further features and implementation forms corresponding to the features and implementation forms of the device of the second aspect.

A fifth aspect of this disclosure relates to a computer program comprising a program code for performing the method according to the third aspect or the fourth aspect when executed on a computer and/or for controlling the device according to the first aspect or the second aspect.

A sixth aspect of this disclosure relates to a coding method, wherein the coding includes decoding or encoding, includes: reserving a buffer space for the picture in a picture buffer, wherein the buffer space does not hold coded data, in particular coded picture data; and signaling or decoding information of the reserved buffer space.

The method may comprise partitioning the picture into tiles, wherein at least one tile does not hold coded data, in particular does not hold coded picture data, and wherein the reserved buffer space is for the at least one tile.

The method may further comprise that all tiles are grouped into slices, which consist either completely of tiles holding coded data or of tiles not holding coded data.

When the coding is decoding, the method includes decoding the information of the reserved buffer space. When the coding is encoding, the method includes signaling the information of the reserved buffer space.

As an example, the information of the reserved buffer space may be used for normative operations. Normative operations may include any processing which is specified by a codec, which has to be done in the exact same manner in order to decode a bitstream correctly.

As an implementation form of the sixth aspect, the reserved buffer space may be used for the generation of samples which are used to improve an inter prediction performance.

As another implementation form of the sixth aspect, the reserved buffer space may be used for the generation of samples which are used to improve an intra prediction performance.

As a further implementation form of the sixth aspect, the reserved buffer space may also be used for the generation of samples which are used for loop filtering purposes. At this implementation, it cannot be applied at the time that a single CTU is decoded. All tiles have to be decoded first, then the face boundaries can be loop filtered.

The method according to the sixth aspect of the invention can be performed by an apparatus according to a seventh aspect of this disclosure. Further features and implementation forms of the method according to the first aspect correspond to the features and implementation forms of the apparatus according to the seventh aspect of the invention.

According to an eighth aspect, this disclosure relates to an apparatus for decoding a video stream includes a processor and a memory. The memory is storing instructions that cause the processor to perform the method according to the first aspect, or the second aspect, or the sixth aspect.

According to a ninth aspect, this disclosure relates to an apparatus for encoding a video stream includes a processor and a memory. The memory is storing instructions that cause the processor to perform the method according to the first aspect, or the second aspect, or the sixth aspect.

According to a tenth aspect, a computer-readable storage medium having stored thereon instructions that when executed cause one or more processors configured to code video data is proposed. The instructions cause the one or more processors to perform a method according to the first or second aspect, or the sixth aspect, or any possible embodiment of the first aspect, or second aspect, or sixth aspect.

According to an eleventh aspect, this disclosure relates to a computer program comprising program code for performing the method according to the first aspect, or the second aspect, or the sixth aspect or any possible embodiment of the first aspect, or the second aspect, or the sixth aspect when executed on a computer.

A twelfth aspect of this disclosure relates to method for coding a picture of a 360° video, wherein the coding comprises encoding or decoding, and wherein the method comprises: reserving a buffer space for the picture in a picture buffer, wherein the buffer space does not hold coded data, in particular coded picture data; and signaling (encoder) or decoding (decoder) information of the reserved buffer space.

In an implementation form of the twelfth aspect, the method further comprises: partitioning the picture into tiles, wherein at least one tile does not hold coded data, and wherein the reserved buffer space is for the at least one tile, and wherein, for example, the method may further comprise: initializing the buffer space corresponding to the at least one tile to a constant value.

In an implementation form of the twelfth aspect, all tiles are grouped into slices, which consist either completely of tiles holding coded data or of tiles not holding coded data.

In an implementation form of the twelfth aspect, the method (for encoding) does not encode the slices that consist of tiles not holding coded data.

In an implementation form of the twelfth aspect, the method (for decoding) does not receive slices covering the complete picture buffer and/or does not receive slices for the uncoded buffer space.

In an implementation form of the twelfth aspect, the information of the reserved buffer space is indicated by a flag.

In an implementation form of the twelfth aspect, the flag is tile_coded_flag, tile_coded_flag equal to 1 specifies that a tile holds CTU data, and tile_coded_flag equal to 0 specifies that a tile holds no CTU data.

In an implementation form of the twelfth aspect, the flag is tile_coded_flag, tile_coded_flag equal to 0 specifies that a tile holds CTU data, and tile_coded_flag equal to 1 specifies that a tile holds no CTU data.

In an implementation form of the twelfth aspect, the method further comprises: reconstructing samples of the picture of the 360° video in accordance with a projection format to obtain a set of 2D faces, wherein the set of 2D faces are interconnected via boundaries.

In an implementation form of the twelfth aspect, a tile which does not hold coded data has a spatial relation to a tile which holds coded data.

In an implementation form of the twelfth aspect, each 2D face holds coded data, and is surrounded in the picture buffer with a region of the at least one slice, which does not hold coded data or with a region of the at least one slice, which consists entirely of tiles not holding coded data.

In an implementation form of the twelfth aspect, the projection format comprises a cube format, an icosahedron format, an equirectangular format, or a modification thereof.

In an implementation form of the twelfth aspect, the buffer space is reserved for geometry padding, and is used for motion compensation (MC).

In an implementation form of the twelfth aspect, the geometry padding is performed at a picture level.

In an implementation form of the twelfth aspect, the buffer space is reserved for an upsampled version of another tile or slice, and is used for prediction.

In an implementation form of the twelfth aspect, the information of the reserved buffer space is used for normative operations.

In an implementation form of the twelfth aspect, the reserved buffer space is used for the generation of samples which are used to improve an inter prediction performance.

In an implementation form of the twelfth aspect, geometry padding is performed at buffer level, inter prediction process at CTU level does not need to be modified.

In an implementation form of the twelfth aspect, the reserved buffer space is used for the generation of samples which are used to improve an intra prediction performance.

In an implementation form of the twelfth aspect, geometry corrected Intra prediction is applied by filling the padding regions with non-reprojected samples of the 3D neighbors before a tile is decoded.

In an implementation form of the twelfth aspect, the reserved buffer space is used for the generation of samples which are used for loop filtering purposes.

In an implementation form of the twelfth aspect, face boundary filtering is performed by filling padding regions with non-reprojected samples of 3D neighbors and applying loop filters across a face boundary.

In an implementation form of the twelfth aspect, sps_360_video_enabled_flag equal to 1 specifies that 360° geometry is signalled and 360° coding tools is used for the video.

In an implementation form of the twelfth aspect, sps_360_video_enabled_flag equal to 0 specifies that 360° geometry is signalled and 360° coding tools is used for the video.

In an implementation form of the twelfth aspect, pps_360_video_geometry_type specifies the geometry type of the 360° video.

A thirteenth aspect of this disclosure provides an encoder comprising processing circuitry for carrying out the method according to the twelfth aspect or any implementation form thereof.

A fourteenth aspect of this disclosure provides a decoder comprising processing circuitry for carrying out the method according to the twelfth aspect or any implementation form thereof.

A fifteenth aspect of this disclosure provides a computer program product comprising a program code for performing the method according to the twelfth aspect or any implementation form thereof.

A sixteenth aspect of this disclosure provides a decoder, comprising: one or more processors; and a non-transitory computer-readable storage medium coupled to the processors and storing programming for execution by the processors, wherein the programming, when executed by the processors, configures the decoder to carry out the method according to the twelfth aspect or any implementation form thereof.

A seventeenth aspect of this disclosure provides an encoder, comprising: one or more processors; and a non-transitory computer-readable storage medium coupled to the processors and storing programming for execution by the processors, wherein the programming, when executed by the processors, configures the encoder to carry out the method according to the twelfth aspect or any implementation form thereof.

Details of one or more embodiments are set forth in the accompanying drawings and the description below. Other features, objects, and advantages will be apparent from the description, drawings, and claims.

BRIEF DESCRIPTION OF THE DRAWINGS

In the following, example embodiments are described in more detail with reference to the attached figures and drawings, in which.

Figure 1A:
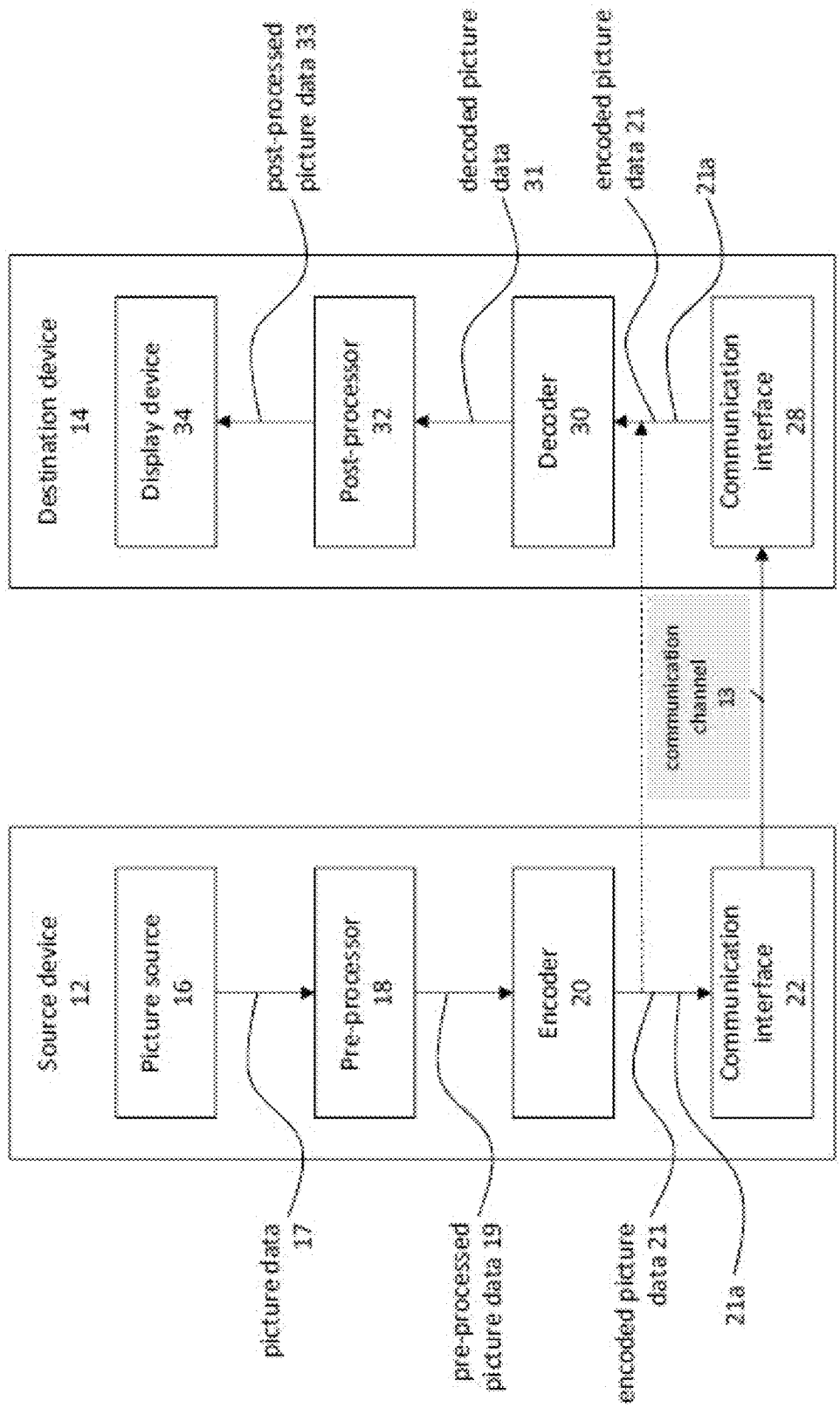
FIG. 1A is a block diagram showing an example of a video coding system configured to implement embodiments of the invention.

In the following, identical reference signs refer to identical or at least functionally equivalent features.

DETAILED DESCRIPTION OF THE EMBODIMENTS

In the following description, reference is made to the accompanying drawings, which form part of the disclosure, and in which are shown, by way of illustration, specific aspects in which the present invention may be placed. It is understood that other aspects may be utilized and structural or logical changes may be made without departing from the scope of the present invention. The following detailed description, therefore, is not to be taken in a limiting sense, as the scope of the present invention is defined be the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. On the other hand, for example, if a specific apparatus is described based on functional units, a corresponding method may include a step performing the described functionality, even if such step is not explicitly described or illustrated in the figures. Further, it is understood that the features of the various example aspects described herein may be combined with each other, unless specifically noted otherwise.

In video coding, a picture is typically a continuous region in the picture buffer. For some applications it can be beneficial to split the picture into non-continuous regions of which only parts need to be coded. The other parts can be filled with data generated from the coded data, which can increase the prediction performance. In current video standards, regions which do not hold coded data are not possible. Pictures can be partitioned using tiles and slices, but every tile and slice holds coded picture data. This partitioning does not allow the creation of regions in the picture, which are not encoded. In order to address this problem, embodiments of the present invention provide methods and apparatus for signaling "uncoded" slices (these are also referred to in this disclosure as "empty" slices, i.e., the terms "uncoded slices" and "empty slices" are interchangeable in this disclosure). The one or more slices not holding coded picture data may be one or more "uncoded slices". These type of slices can be used to create regions in the buffer, which have a special spatial relation to the other content, but do not hold coded data. Consequently these slices can be omitted from the bitstream.

Video coding typically refers to the processing of a sequence of pictures, which form the video or video sequence. Instead of the term "picture" the term "frame" or "image" may be used as synonyms in the field of video coding. Video coding (or coding in general) comprises two parts video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (Coding and Decoding).

Introduce two terms used in this disclosure:

3D arrangement: arrangement of the coded samples in the 3D geometry according to the projection format before being back-projected to the 3D sphere (e.g. the faces of a cube), including the identification of connected edges in the coding arrangement.

Coding arrangement: 2D arrangement of the coded samples used for encoding.

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

In the following embodiments of a video coding system 10, a video encoder 20 and a video decoder 30 are described based on FIGS. 1 to 3.

FIG. 1A is a schematic block diagram illustrating an example coding system 10, e.g. a video coding system 10 (or short coding system 10) that may utilize techniques of this present application. Video encoder 20 (or short encoder 20) and video decoder 30 (or short decoder 30) of video coding system 10 represent examples of devices that may be configured to perform techniques in accordance with various examples described in the present application. For example, the video encoder 20 may be configured to perform the method of the third aspect described above in the summary. The video encoder 20 may comprise the device of the first aspect described in the summary. The video decoder 30 may be configured to perform the method of the fourth aspect described above in the summary. The video decoder 30 may comprise the device of the second aspect described in the summary.

As shown in FIG. 1A, the coding system 10 comprises a source device 12 configured to provide encoded picture data 21 e.g. to a destination device 14 for decoding the encoded picture data 13. Further, the source device 12 may be configured to provide information 21*a* for decoding (of the picture data 21) to the destination device 14.

The source device 12 comprises an encoder 20, and may additionally, i.e. optionally, comprise a picture source 16, a pre-processor (or pre-processing unit) 18, e.g. a picture pre-processor 18, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g. from RGB to YCbCr), color correction, or de-noising. It can be understood that the pre-processing unit 18 may be optional component.

The video encoder 20 is configured to receive the pre-processed picture data 19 and provide encoded picture data 21 and optionally the information 21*a* for decoding (further details will be described below, e.g., based on FIG. 2).

Communication interface 22 of the source device 12 may be configured to receive the encoded picture data 21 and optionally the information 21a for decoding, and to transmit the encoded picture data 21 (or any further processed version thereof) over communication channel 13 to another device, e.g. the destination device 14 or any other device, for storage or direct reconstruction.

The destination device 14 comprises a decoder 30 (e.g. a video decoder 30), and may additionally, i.e. optionally, comprise a communication interface or communication unit 28, a post-processor 32 (or post-processing unit 32) and a display device 34.

The communication interface 28 of the destination device 14 is configured receive the encoded picture data 21 and optionally the information 21a for decoding (or any further processed version thereof), e.g. directly from the source device 12 or from any other source, e.g. a storage device, e.g. an encoded picture data storage device, and provide the encoded picture data 21 to the decoder 30.

The communication interface 22 and the communication interface 28 may be configured to transmit or receive the encoded picture data 21 and optionally the information 21a for decoding, or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21 and optionally the information 21a for decoding.

Both, communication interface 22 and communication interface 28 may be configured as unidirectional communication interfaces as indicated by the arrow for the communication channel 13 in FIG. 1A pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31 (further details will be described below, e.g., based on FIG. 3 or FIG. 5).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
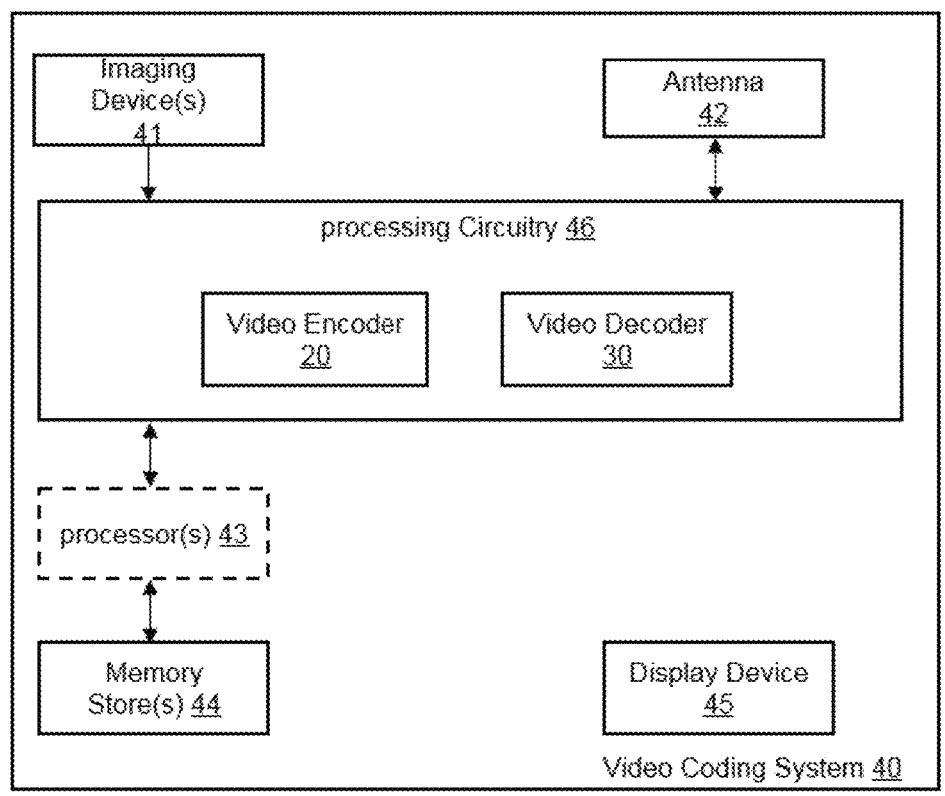
FIG. 1B is a block diagram showing another example of a video coding system configured to implement embodiments of the invention.

The encoder 20 (e.g. a video encoder 20) or the decoder 30 (e.g. a video decoder 30) or both encoder 20 and decoder 30 may be implemented via processing circuitry as shown in FIG. 1B, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 2 and/or any other encoder system or subsystem described herein. The decoder 30 may be implemented via processing circuitry 46 to embody the various modules as discussed with respect to decoder 30 of FIG. 3 and/or any other decoder system or subsystem described herein. The processing circuitry may be configured to perform the various operations as discussed later. As shown in FIG. 5, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 1B.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments of the invention are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the invention are not limited to HEVC or VVC.

Encoder and Encoding Method

Figure 2:
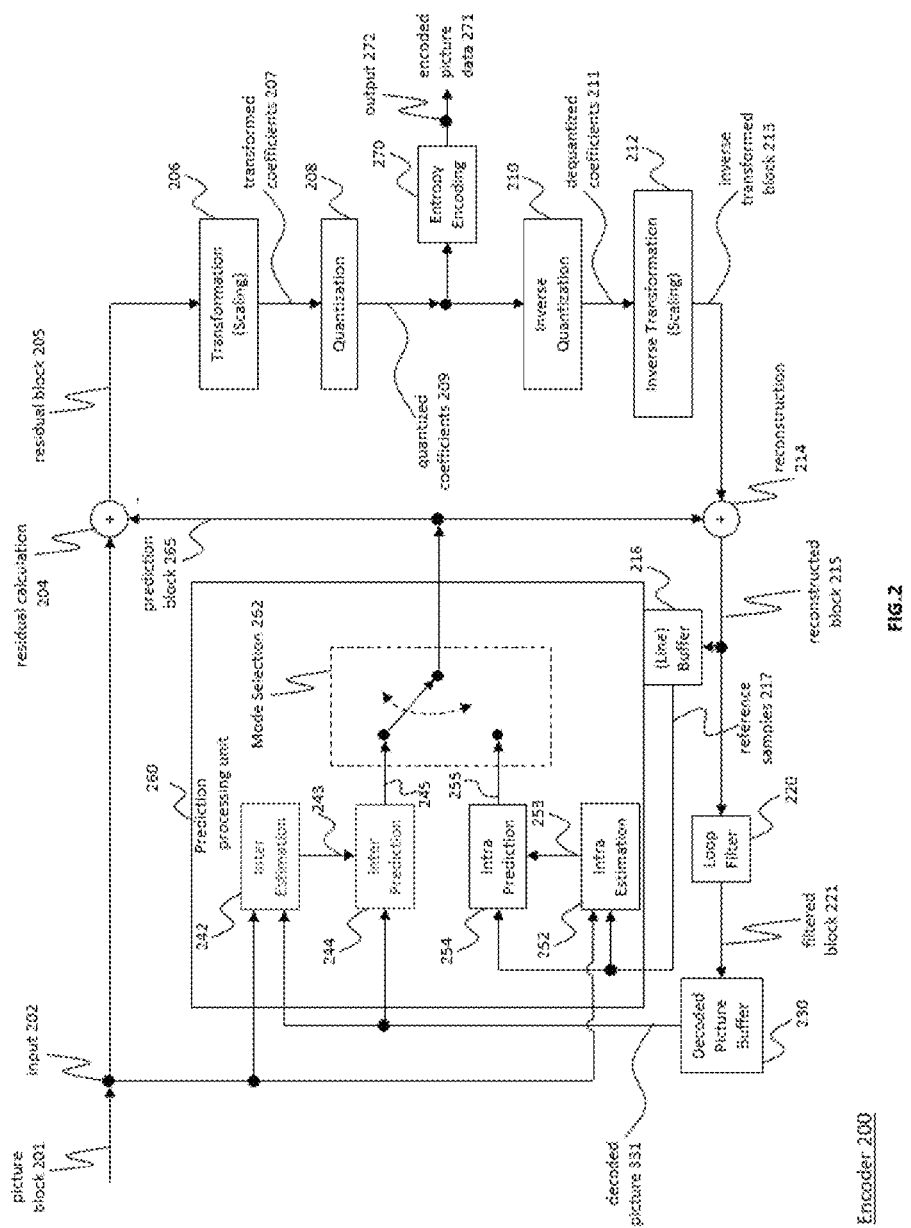
FIG. 2 is a block diagram showing an example of a video encoder configured to implement embodiments of the invention.

FIG. 2 shows a schematic block diagram of an example video encoder 20 that is configured to implement the techniques of the present application. In the example of FIG. 2, the video encoder 20 comprises an input 201 (or input interface 201), a residual calculation unit 204, a transform processing unit 206, a quantization unit 208, an inverse quantization unit 210, and inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254 and a partitioning unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

Figure 3:
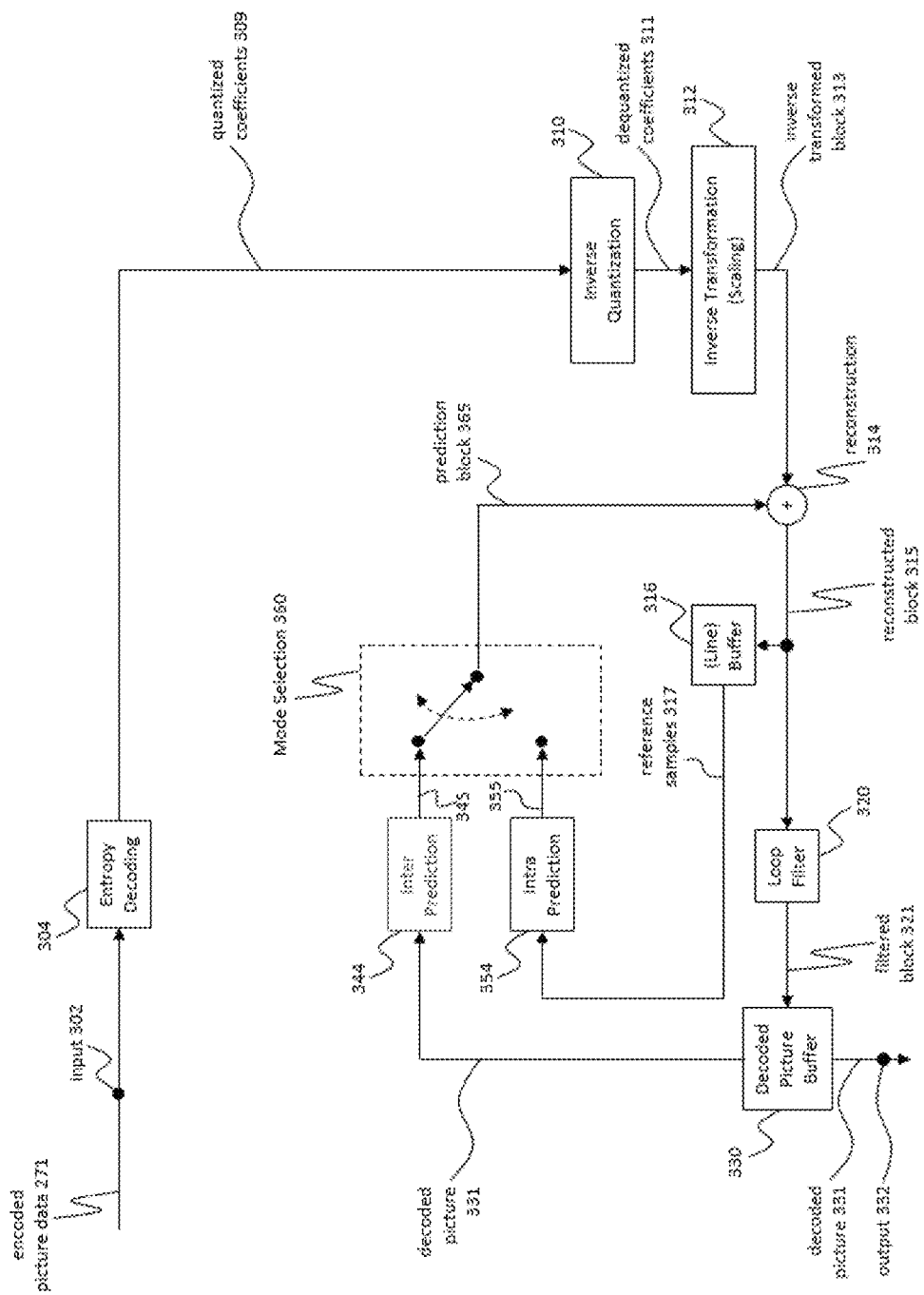
FIG. 3 is a block diagram showing an example structure of a video decoder configured to implement embodiments of the invention.

The residual calculation unit 204, the transform processing unit 206, the quantization unit 208, the mode selection unit 260 may be referred to as forming a forward signal path of the encoder 20, whereas the inverse quantization unit 210, the inverse transform processing unit 212, the reconstruction unit 214, the buffer 216, the loop filter 220, the decoded picture buffer (DPB) 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the decoded picture buffer (DPB) 230, the inter prediction unit 244 and the intra-prediction unit 254 are also referred to forming the "built-in decoder" of video encoder 20.

Pictures & Picture Partitioning (Pictures & Blocks)

The encoder 20 may be configured to receive, e.g. via input 201, a picture 17 (or picture data 17), e.g. picture of a sequence of pictures forming a video or video sequence. The received picture or picture data may also be a pre-processed picture 19 (or pre-processed picture data 19). For sake of simplicity the following description refers to the picture 17. The picture 17 may also be referred to as current picture or picture to be coded (in particular in video coding to distinguish the current picture from other pictures, e.g. previously encoded and/or decoded pictures of the same video sequence, i.e. the video sequence which also comprises the current picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each sample is typically represented in a luminance and chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 color format.

Embodiments of the video encoder 20 may comprise a picture partitioning unit (not depicted in FIG. 2) configured to partition the picture 17 into a plurality of (typically non-overlapping) picture blocks 203. These blocks may also be referred to as root blocks, macro blocks (H.264/AVC) or coding tree blocks (CTB) or coding tree units (CTU) (H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 17, e.g. one, several or all blocks forming the picture 17. The picture block 203 may also be referred to as current picture block or picture block to be coded.

Like the picture 17, the picture block 203 again is or can be regarded as a two-dimensional array or matrix of samples with intensity values (sample values), although of smaller dimension than the picture 17. In other words, the block 203 may comprise, e.g., one sample array (e.g. a luma array in case of a monochrome picture 17, or a luma or chroma array in case of a color picture) or three sample arrays (e.g. a luma and two chroma arrays in case of a color picture 17) or any other number and/or kind of arrays depending on the color format applied. The number of samples in horizontal and vertical direction (or axis) of the block 203 define the size of block 203. Accordingly, a block may, for example, an M×N (M-column by N-row) array of samples, or an M×N array of transform coefficients.

Embodiments of the video encoder 20 as shown in FIG. 2 may be configured encode the picture 17 block by block, e.g. the encoding and prediction is performed per block 203.

Residual Calculation

The residual calculation unit 204 may be configured to calculate a residual block 205 (also referred to as residual 205) based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.

Transform

The transform processing unit 206 may be configured to apply a transform, e.g. a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and implementation costs, etc. Specific scaling factors are, for example, specified for the inverse transform, e.g. by inverse transform processing unit 212 (and the corresponding inverse transform, e.g. by inverse transform processing unit 312 at video decoder 30) and corresponding scaling factors for the forward transform, e.g. by transform processing unit 206, at an encoder 20 may be specified accordingly.

Embodiments of the video encoder 20 (respectively transform processing unit 206) may be configured to output transform parameters, e.g. a type of transform or transforms, e.g. directly or encoded or compressed via the entropy encoding unit 270, so that, e.g., the video decoder 30 may receive and use the transform parameters for decoding.

Quantization

The quantization unit 208 may be configured to quantize the transform coefficients 207 to obtain quantized coefficients 209, e.g. by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit Transform coefficient during quantization, where n is greater than m. The degree of quantization may be modified by adjusting a quantization parameter (QP). For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding and/or the inverse dequantization, e.g. by inverse quantization unit 210, may include multiplication by the quantization step size. Embodiments according to some standards, e.g. HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

Embodiments of the video encoder 20 (respectively quantization unit 208) may be configured to output quantization parameters (QP), e.g. directly or encoded via the entropy encoding unit 270, so that, e.g., the video decoder 30 may receive and apply the quantization parameters for decoding.

Inverse Quantization

The inverse quantization unit 210 is configured to apply the inverse quantization of the quantization unit 208 on the quantized coefficients to obtain dequantized coefficients 211, e.g. by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

Inverse Transform

The inverse transform processing unit 212 is configured to apply the inverse transform of the transform applied by the transform processing unit 206, e.g. an inverse discrete cosine transform (DCT) or inverse discrete sine transform (DST) or other inverse transforms, to obtain a reconstructed residual block 213 (or corresponding dequantized coefficients 213) in the sample domain. The reconstructed residual block 213 may also be referred to as transform block 213.

Reconstruction

The reconstruction unit 214 (e.g. adder or summer 214) is configured to add the transform block 213 (i.e. reconstructed residual block 213) to the prediction block 265 to obtain a reconstructed block 215 in the sample domain, e.g. by adding—sample by sample—the sample values of the reconstructed residual block 213 and the sample values of the prediction block 265.

Filtering

The loop filter unit 220 (or short "loop filter" 220), is configured to filter the reconstructed block 215 to obtain a filtered block 221, or in general, to filter reconstructed samples to obtain filtered samples. The loop filter unit is, e.g., configured to smooth sample transitions, or otherwise improve the video quality. The loop filter unit 220 may comprise one or more loop filters such as a de-blocking filter, a sample-adaptive offset (SAO) filter or one or more other filters, e.g. a bilateral filter, an adaptive loop filter (ALF), a sharpening, a smoothing filters or a collaborative filters, or any combination thereof. Although the loop filter unit 220 is shown in FIG. 2 as being an in loop filter, in other configurations, the loop filter unit 220 may be implemented as a post loop filter. The filtered block 221 may also be referred to as filtered reconstructed block 221.

Embodiments of the video encoder 20 (respectively loop filter unit 220) may be configured to output loop filter parameters (such as sample adaptive offset information), e.g. directly or encoded via the entropy encoding unit 270, so that, e.g., a decoder 30 may receive and apply the same loop filter parameters or respective loop filters for decoding.

Decoded Picture Buffer

The decoded picture buffer (DPB) 230 may be a memory that stores reference pictures, or in general reference picture data, for encoding video data by video encoder 20.

The DPB 230 may be formed by any of a variety of memory devices, such as dynamic random access memory (DRAM), including synchronous DRAM (SDRAM), magnetoresistive RAM (MRAM), resistive RAM (RRAM), or other types of memory devices. The decoded picture buffer (DPB) 230 may be configured to store one or more filtered blocks 221. The decoded picture buffer 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter prediction. The decoded picture buffer (DPB) 230 may be also configured to store one or more unfiltered reconstructed blocks 215, or in general unfiltered reconstructed samples, e.g. if the reconstructed block 215 is not filtered by loop filter unit 220; or the data stored in the uncoded (or empty) tile regions, accordingly, in the example of FIG. 8A, face boundaries 4 and 4', 7 and 7', 8 and 8', 9 and 9' are continuous, whereas face boundaries 10 and 12', 11 and 5, 12 and 2 are discontinuous boundaries; in the example of FIG. 8B, face boundaries 3 and 3', 7 and 7', 5 and 5', 12 and 12' are continuous, whereas face boundaries 1 and 10', 9' and 1', 8 and 9 are discontinuous boundaries; or any other further processed version of the reconstructed blocks or samples.

Mode Selection (Partitioning & Prediction)

The mode selection unit 260 comprises partitioning unit 262, inter-prediction unit 244 and intra-prediction unit 254, and is configured to receive or obtain original picture data, e.g. an original block 203 (current block 203 of the current picture 17), and reconstructed picture data, e.g. filtered and/or unfiltered reconstructed samples or blocks of the same (current) picture and/or from one or a plurality of previously decoded pictures, e.g. from decoded picture buffer 230 or other buffers (e.g. line buffer, not shown). The reconstructed picture data is used as reference picture data for prediction, e.g. inter-prediction or intra-prediction, to obtain a prediction block 265 or predictor 265.

Mode selection unit 260 may be configured to determine or select a partitioning for a current block prediction mode (including no partitioning) and a prediction mode (e.g. an intra or inter prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g. from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e. select the prediction mode which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition the block 203 into smaller block partitions or sub-blocks (which form again blocks), e.g. iteratively using quad-tree-partitioning (QT), binary partitioning (BT) or triple-tree-partitioning (TT) or any combination thereof, and to perform, e.g., the prediction for each of the block partitions or sub-blocks, wherein the mode selection comprises the selection of the tree-structure of the partitioned block 203 and the prediction modes are applied to each of the block partitions or sub-blocks.

In the following the partitioning (e.g. by partitioning unit 260) and prediction processing (by inter-prediction unit 244 and intra-prediction unit 254) performed by an example video encoder 20 will be explained in more detail.

Partitioning

The partitioning unit 262 may partition (or split) a current block 203 into smaller partitions, e.g. smaller blocks of square or rectangular size. These smaller blocks (which may also be referred to as sub-blocks) may be further partitioned into even smaller partitions. This is also referred to tree-partitioning or hierarchical tree-partitioning, wherein a root block, e.g. at root tree-level 0 (hierarchy-level 0, depth 0), may be recursively partitioned, e.g. partitioned into two or more blocks of a next lower tree-level, e.g. nodes at tree-level 1 (hierarchy-level 1, depth 1), wherein these blocks may be again partitioned into two or more blocks of a next lower level, e.g. tree-level 2 (hierarchy-level 2, depth 2), etc. until the partitioning is terminated, e.g. because a termination criterion is fulfilled, e.g. a maximum tree depth or minimum block size is reached. Blocks which are not further partitioned are also referred to as leaf-blocks or leaf nodes of the tree. A tree using partitioning into two partitions is referred to as binary-tree (BT), a tree using partitioning into three partitions is referred to as ternary-tree (TT), and a tree using partitioning into four partitions is referred to as quad-tree (QT).

As mentioned before, the term "block" as used herein may be a portion, in particular a square or rectangular portion, of a picture. With reference, for example, to HEVC and VVC, the block may be or correspond to a coding tree unit (CTU), a coding unit (CU), prediction unit (PU), and transform unit (TU) and/or to the corresponding blocks, e.g. a coding tree block (CTB), a coding block (CB), a transform block (TB) or prediction block (PB).

For example, a coding tree unit (CTU) may be or comprise a CTB of luma samples, two corresponding CTBs of chroma samples of a picture that has three sample arrays, or a CTB of samples of a monochrome picture or a picture that is coded using three separate color planes and syntax structures used to code the samples. Correspondingly, a coding tree block (CTB) may be an N×N block of samples for some value of N such that the division of a component into CTBs is a partitioning. A coding unit (CU) may be or comprise a coding block of luma samples, two corresponding coding blocks of chroma samples of a picture that has three sample arrays, or a coding block of samples of a monochrome picture or a picture that is coded using three separate color planes and syntax structures used to code the samples. Correspondingly a coding block (CB) may be an M×N block of samples for some values of M and N such that the division of a CTB into coding blocks is a partitioning.

In embodiments, e.g., according to HEVC, a coding tree unit (CTU) may be split into CUs by using a quad-tree structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU.

In embodiments, e.g., according to the latest video coding standard currently in development, which is referred to as Versatile Video Coding (VVC), Quad-tree and binary tree (QTBT) partitioning is used to partition a coding block. In the QTBT block structure, a CU can have either a square or rectangular shape. For example, a coding tree unit (CTU) is first partitioned by a quadtree structure. The quadtree leaf nodes are further partitioned by a binary tree or ternary (or triple) tree structure. The partitioning tree leaf nodes are called coding units (CUs), and that segmentation is used for prediction and transform processing without any further partitioning. This means that the CU, PU and TU have the same block size in the QTBT coding block structure. In parallel, multiple partition, for example, triple tree partition was also proposed to be used together with the QTBT block structure.

In one example, the mode selection unit 260 of video encoder 20 may be configured to perform any combination of the partitioning techniques described herein.

As described above, the video encoder 20 is configured to determine or select the best or an optimum prediction mode from a set of (pre-determined) prediction modes. The set of prediction modes may comprise, e.g., intra-prediction modes and/or inter-prediction modes.

Intra-Prediction

The set of intra-prediction modes may comprise 35 different intra-prediction modes, e.g. non-directional modes like DC (or mean) mode and planar mode, or directional modes, e.g. as defined in HEVC, or may comprise 67 different intra-prediction modes, e.g. non-directional modes like DC (or mean) mode and planar mode, or directional modes, e.g. as defined for VVC.

The intra-prediction unit 254 is configured to use reconstructed samples of neighboring blocks of the same current picture to generate an intra-prediction block 265 according to an intra-prediction mode of the set of intra-prediction modes.

The intra prediction unit 254 (or in general the mode selection unit 260) is further configured to output intra-prediction parameters (or in general information indicative of the selected intra prediction mode for the block) to the entropy encoding unit 270 in form of syntax elements 266 for inclusion into the encoded picture data 21, so that, e.g., the video decoder 30 may receive and use the prediction parameters for decoding.

Inter-Prediction

The set of (or possible) inter-prediction modes depends on the available reference pictures (i.e. previous at least partially decoded pictures, e.g. stored in DBP 230) and other inter-prediction parameters, e.g. whether the whole reference picture or only a part, e.g. a search window area around the area of the current block, of the reference picture is used for searching for a best matching reference block, and/or e.g. whether sample interpolation is applied, e.g. half/semi-pel and/or quarter-pel interpolation, or not.

Additional to the above prediction modes, skip mode and/or direct mode may be applied.

The inter prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks, e.g. reconstructed blocks of one or a plurality of other/different previously decoded pictures 231, for motion estimation. E.g. a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter prediction parameters to the motion estimation unit. This offset is also called motion vector (MV).

The motion compensation unit is configured to obtain, e.g. receive, an inter prediction parameter and to perform inter prediction based on or using the inter prediction parameter to obtain an inter prediction block 265. Motion compensation, performed by the motion compensation unit, may involve fetching or generating the prediction block based on the motion/block vector determined by motion estimation, possibly performing interpolations to sub-sample precision. Interpolation filtering may generate additional samples from known samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

Motion compensation unit may also generate syntax elements associated with the blocks and the video slice for use by video decoder 30 in decoding the picture blocks of the video slice.

Entropy Coding

The entropy encoding unit 270 is configured to apply, for example, an entropy encoding algorithm or scheme (e.g. a variable length coding (VLC) scheme, an context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients 209, inter prediction parameters, intra prediction parameters, loop filter parameters and/or other syntax elements to obtain encoded picture data 21 which can be output via the output 272, e.g. in the form of an encoded bitstream 21, so that, e.g., the video decoder 30 may receive and use the parameters for decoding, The encoded bitstream 21 may be transmitted to video decoder 30, or stored in a memory for later transmission or retrieval by video decoder 30.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

Decoder and Decoding Method

FIG. 3 shows an example of a video decoder 30 that is configured to implement the techniques of this present application. The video decoder 30 is configured to receive encoded picture data 21 (e.g. encoded bitstream 21), e.g. encoded by encoder 20, to obtain a decoded picture 331. The encoded picture data or bitstream comprises information for decoding the encoded picture data, e.g. data that represents picture blocks of an encoded video slice and associated syntax elements.

In the example of FIG. 3, the decoder 30 comprises an entropy decoding unit 304, an inverse quantization unit 310, an inverse transform processing unit 312, a reconstruction unit 314 (e.g. a summer 314), a loop filter 320, a decoded picture buffer (DBP) 330, an inter prediction unit 344 and an intra prediction unit 354. Inter prediction unit 344 may be or include a motion compensation unit. Video decoder 30 may, in some examples, perform a decoding pass generally reciprocal to the encoding pass described with respect to video encoder 100 from FIG. 2.

As explained with regard to the encoder 20, the inverse quantization unit 210, the inverse transform processing unit 212, the reconstruction unit 214 the loop filter 220, the decoded picture buffer (DPB) 230, the inter prediction unit 344 and the intra prediction unit 354 are also referred to as forming the "built-in decoder" of video encoder 20. Accordingly, the inverse quantization unit 310 may be identical in function to the inverse quantization unit 110, the inverse transform processing unit 312 may be identical in function to the inverse transform processing unit 212, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video 20 encoder apply correspondingly to the respective units and functions of the video decoder 30.

Entropy Decoding

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters (not shown in FIG. 3), e.g. any or all of inter prediction parameters (e.g. reference picture index and motion vector), intra prediction parameter (e.g. intra prediction mode or index), transform parameters, quantization parameters, loop filter parameters, and/or other syntax elements. Entropy decoding unit 304 maybe configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode selection unit 360 and other parameters to other units of the decoder 30. Video decoder 30 may receive the syntax elements at the video slice level and/or the video block level.

Inverse Quantization

The inverse quantization unit 310 may be configured to receive quantization parameters (QP) (or in general information related to the inverse quantization) and quantized coefficients from the encoded picture data 21 (e.g. by parsing and/or decoding, e.g. by entropy decoding unit 304) and to apply based on the quantization parameters an inverse quantization on the decoded quantized coefficients 309 to obtain dequantized coefficients 311, which may also be referred to as transform coefficients 311. The inverse quantization process may include use of a quantization parameter determined by video encoder 20 for each video block in the video slice to determine a degree of quantization and, likewise, a degree of inverse quantization that should be applied.

Inverse Transform

Inverse transform processing unit 312 may be configured to receive dequantized coefficients 311, also referred to as transform coefficients 311, and to apply a transform to the dequantized coefficients 311 in order to obtain reconstructed residual blocks 213 in the sample domain. The reconstructed residual blocks 213 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g. by parsing and/or decoding, e.g. by entropy decoding unit 304) to determine the transform to be applied to the dequantized coefficients 311.

Reconstruction

The reconstruction unit 314 (e.g. adder or summer 314) may be configured to add the reconstructed residual block 313, to the prediction block 365 to obtain a reconstructed block 315 in the sample domain, e.g. by adding the sample values of the reconstructed residual block 313 and the sample values of the prediction block 365.

Filtering

The loop filter unit 320 (either in the coding loop or after the coding loop) is configured to filter the reconstructed block 315 to obtain a filtered block 321, e.g. to smooth sample transitions, or otherwise improve the video quality. The loop filter unit 320 may comprise one or more loop filters such as a de-blocking filter, a sample-adaptive offset (SAO) filter or one or more other filters, e.g. a bilateral filter, an adaptive loop filter (ALF), a sharpening, a smoothing filters or a collaborative filters, or any combination thereof. Although the loop filter unit 320 is shown in FIG. 3 as being an in loop filter, in other configurations, the loop filter unit 320 may be implemented as a post loop filter.

Decoded Picture Buffer

The decoded video blocks 321 of a picture are then stored in decoded picture buffer 330, which stores the decoded pictures 331 as reference pictures for subsequent motion compensation for other pictures and/or for output respectively display.

The decoder 30 is configured to output the decoded picture 311, e.g. via output 312, for presentation or viewing to a user.

Prediction

The inter prediction unit 344 may be identical to the inter prediction unit 244 (in particular to the motion compensation unit) and the intra prediction unit 354 may be identical to the inter prediction unit 254 in function, and performs split or partitioning decisions and prediction based on the partitioning and/or prediction parameters or respective information received from the encoded picture data 21 (e.g. by parsing and/or decoding, e.g. by entropy decoding unit 304). Mode selection unit 360 may be configured to perform the prediction (intra or inter prediction) per block based on reconstructed pictures, blocks or respective samples (filtered or unfiltered) to obtain the prediction block 365.

When the video slice is coded as an intra coded (I) slice, intra prediction unit 354 of mode selection unit 360 is configured to generate prediction block 365 for a picture block of the current video slice based on a signaled intra prediction mode and data from previously decoded blocks of the current picture. When the video picture is coded as an inter coded (i.e., B, or P) slice, inter prediction unit 344 (e.g. motion compensation unit) of mode selection unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330.

Mode selection unit 360 is configured to determine the prediction information for a video block of the current video slice by parsing the motion vectors and other syntax elements, and uses the prediction information to produce the prediction blocks for the current video block being decoded. For example, the mode selection unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current step may be further processed and then output to the next step. For example, after interpolation filtering, motion vector derivation or loop filtering, a further operation, such as Clip or shift, may be performed on the processing result of the interpolation filtering, motion vector derivation or loop filtering.

It should be noted that further operations may be applied to the derived motion vectors of current block (including but not limit to control point motion vectors of affine mode, sub-block motion vectors in affine, planar, ATMVP modes, temporal motion vectors, and so on). For example, the value of motion vector is constrained to a predefined range according to its representing bit. If the representing bit of motion vector is bitDepth, then the range is $-2^{(bitDepth-1)} \sim 2^{(bitDepth-1)}-1$, where "^" means exponentiation. For example, if bitDepth is set equal to 16, the range is −32768~32767; if bitDepth is set equal to 18, the range is −131072~131071. Here provides two methods for constraining the motion vector.

Method 1: remove the overflow MSB (most significant bit) by flowing operations $$ux=(mvx+2^{bitDepth})\%2^{bitDepth} \qquad (1)$$

$$mvx=(ux>=2^{bitDepth-1})?(ux-2^{bitDepth}):ux \qquad (2)$$

$$uy=(mvy+2^{bitDepth})\%2^{bitDepth} \qquad (3)$$

$$mvy=(uy>=2^{bitDepth-1})?(uy-2^{bitDepth}):uy \qquad (4)$$

For example, if the value of mvx is −32769, after applying formula (1) and (2), the resulting value is 32767. In computer system, decimal numbers are stored as two's complement. The two's complement of −32769 is 1,0111,1111,1111,1111 (17 bits), then the MSB is discarded, so the resulting two's complement is 0111,1111,1111,1111 (decimal number is 32767), which is same as the output by applying formula (1) and (2).

$$ux=(mvpx+mvdx+2^{bitDepth})\%2^{bitDepth} \qquad (5)$$

$$mvx=(ux>=2^{bitdepth-1})?(ux-2^{bitdepth}):ux \qquad (6)$$

$$uy=(mvpy+mvdy+2^{bitDepth})\%2^{bitDepth} \qquad (7)$$

$$mvy=(uy>=2^{bitDepth-1})?(uy-2^{bitDepth}):uy \qquad (8)$$

The operations may be applied during the sum of mvp and mvd, as shown in formula (5) to (8).

Method 2: remove the overflow MSB by clipping the value $$vx=\text{Clip3}(-2^{bitDepth-1}, 2^{bitDepth-1}-1, vx)$$

$$vy=\text{Clip3}(-2^{bitpepth-1}, 2^{bitDepth-1}-1, vy)$$

where the definition of function Clip3 is as follow:

$$\text{Clip3}(x, y, z) = \begin{cases} x & ; \quad z < x \\ y & ; \quad z > y \\ z & ; \quad \text{otherwise} \end{cases}$$

Figure 4:
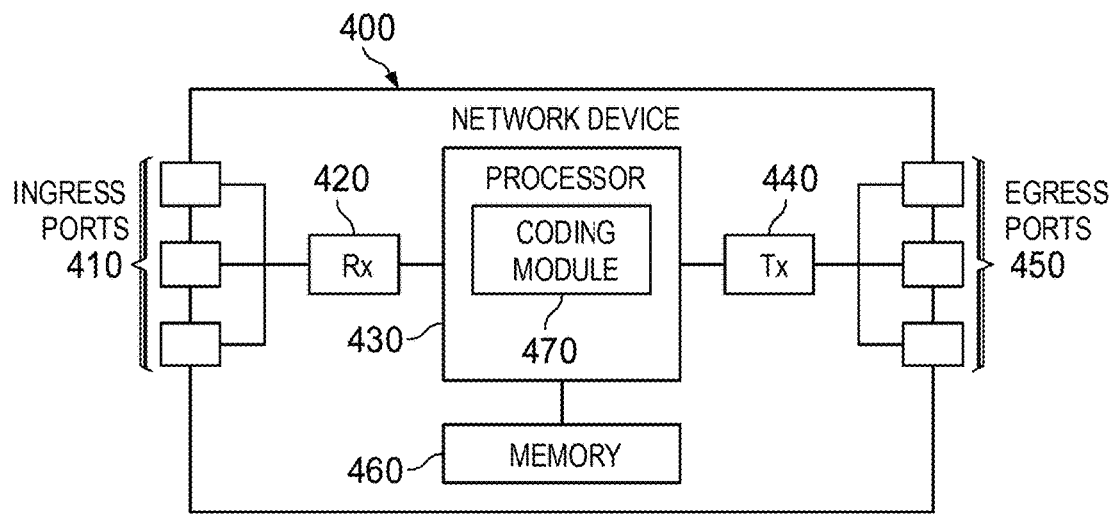
FIG. 4 is a block diagram illustrating an example of an encoding apparatus or a decoding apparatus.

FIG. 4 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A. The video coding device 400 may comprise the device of the first aspect or the device of the second aspect, as described in the summary.

The video coding device 400 comprises ingress ports 410 (or input ports 410) and receiver units (Rx) 420 for receiving data; a processor, logic unit, or central processing unit (CPU) 430 to process the data; transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

Figure 5:
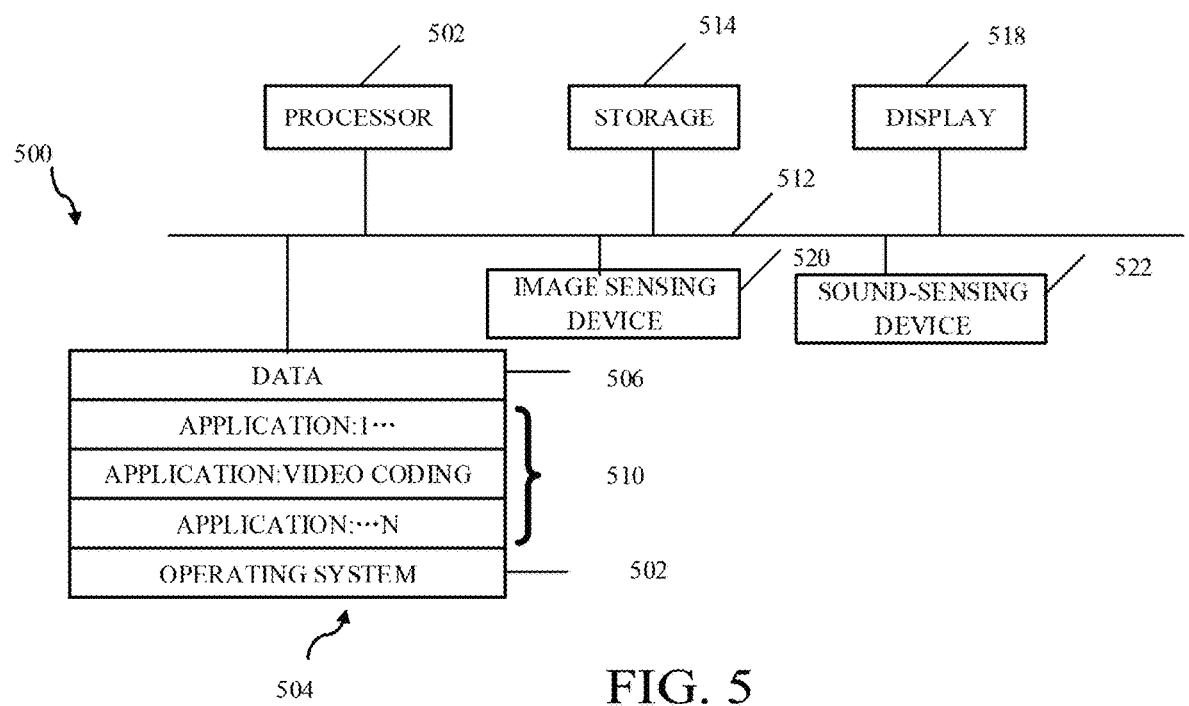
FIG. 5 is a block diagram illustrating another example of an encoding apparatus or a decoding apparatus.

FIG. 5 is a simplified block diagram of an apparatus 500 that may be used as either or both of the source device 12 and the destination device 14 from FIG. 1 according to an exemplary embodiment.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

A scene may be captured in all directions around a single view point for 360-degree sequences. This can be achieved using multiple cameras arranged close to each other and with different view directions. The captured content is then stitched and can be thought of as a sphere around the view point with texture on it which represents the 360-degree scene. However, current display and video codecs require a flat (2D) rectangular image of a scene. Thus the sphere has to be converted to such a 2D format. There a several ways to do this, including but not limited to:

a) an equirectangular format involves a projection to a rectangle similar to, e.g., the one that is used to create world maps from the globe of the earth. Here, distortion depends on position.

b) cube format involves mapping the sphere to the faces of a cube. Each face looks like a usual 2D image, with no visible geometrical distortions. However, there are geometrical distortions at the border of two faces.

c) icosahedron format involves mapping the sphere to the faces of an icosahedron. There are geometrical distortions at the border of two faces, though not as strong as for the cube format, since the angle between neighboring faces is lower.

d) other formats based on equirectangular or cube format as defined in JVET-L1004, such as (but not limited to) adjusted cubemap projection format, Equi-angular cubemap projection, Hybrid equi-angular cubemap projection, Adjusted equal-area projection format, etc.

In an embodiment, samples (such as filter support samples) may be obtained from connected or adjoining faces on the sphere for a current coding block e.g., as follows:

Option 1: by copying the samples from the third 2D face directly and by using these samples for performing the loop-filtering if they are available or reconstructed, or Option 2: by using geometric information to project the samples (if available or reconstructed) of the third 2D face to the 3D sphere, by mapping the projected samples in the 3D sphere to a projection format based on the geometric information and a selected interpolation filter, and then by using the mapped samples in the projection format as the filter support samples for performing the loop-filtering.

Figure 6A:
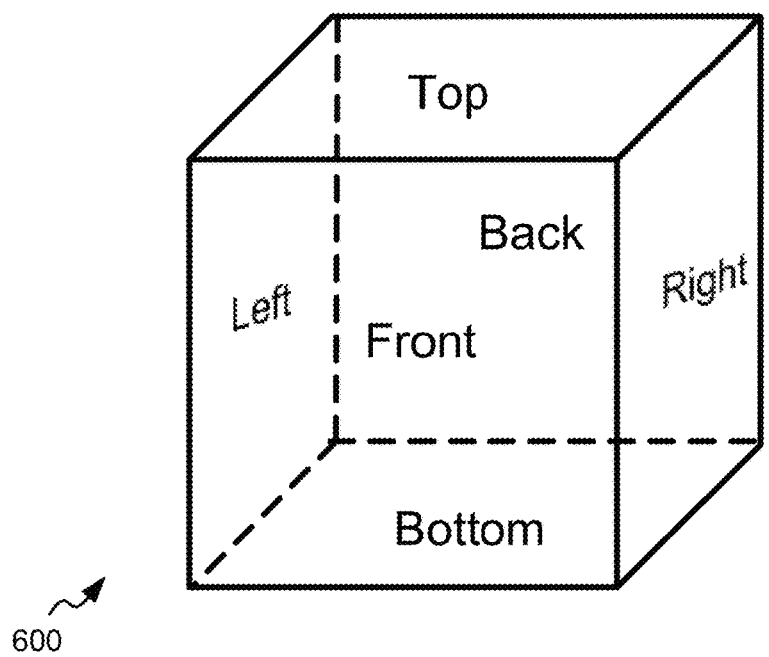
FIG. 6A is a diagram illustrating an example of a cube projection format.
Figure 6B:
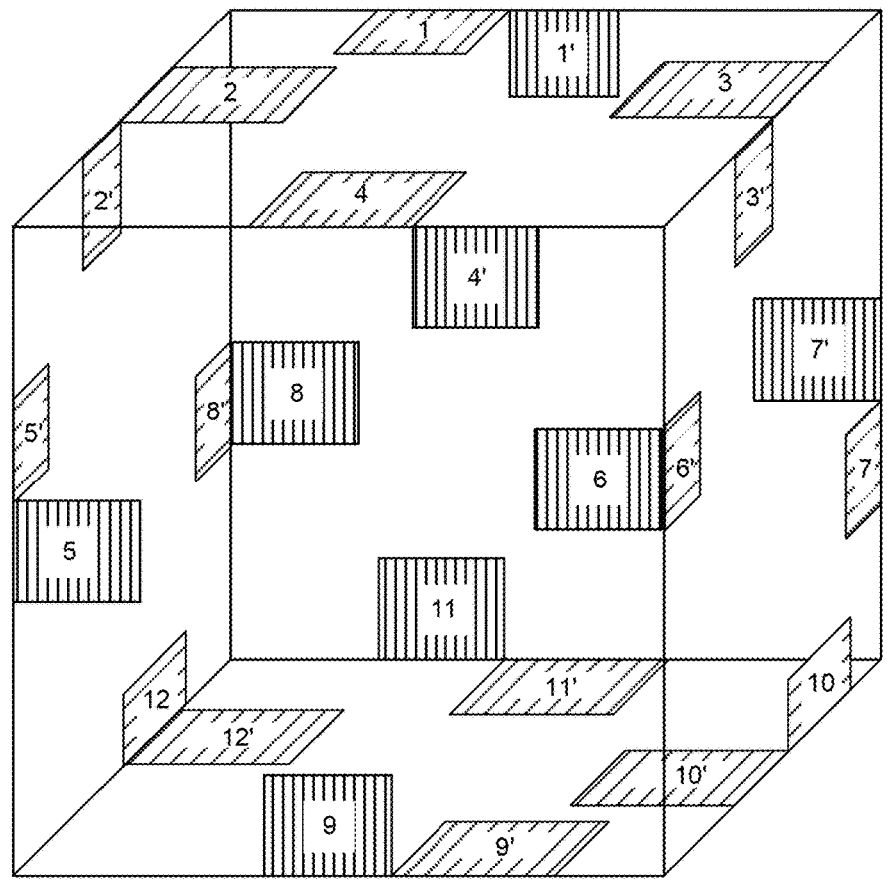
FIG. 6B is another diagram further illustrating an example of the cube projection format.
Figure 7:
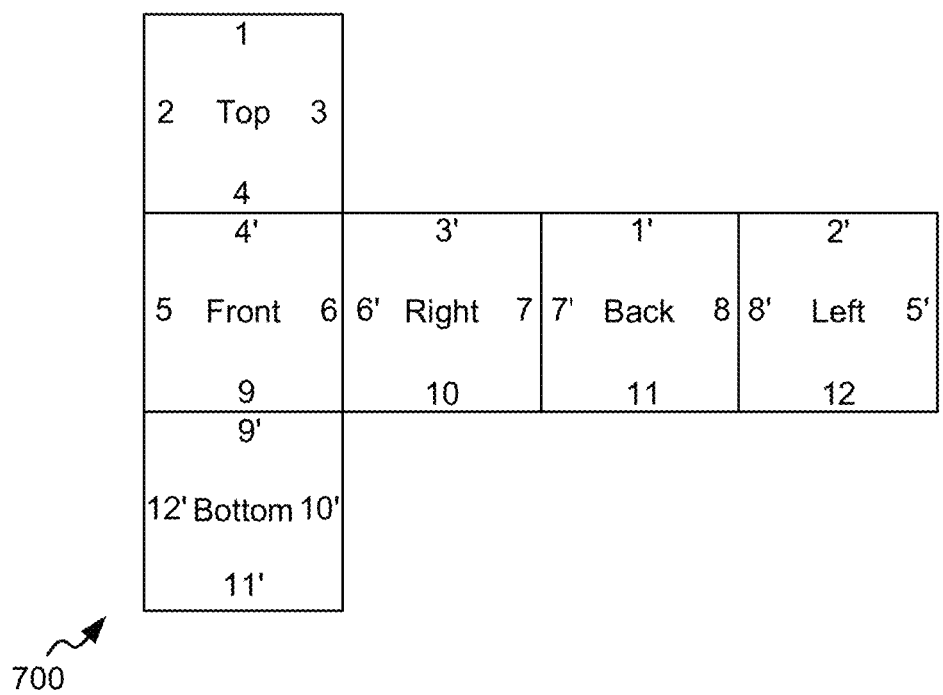
FIG. 7 is a diagram illustrating an example of a 2D representation of a spherical video, in accordance with a cube projection format.
Figure 8A:
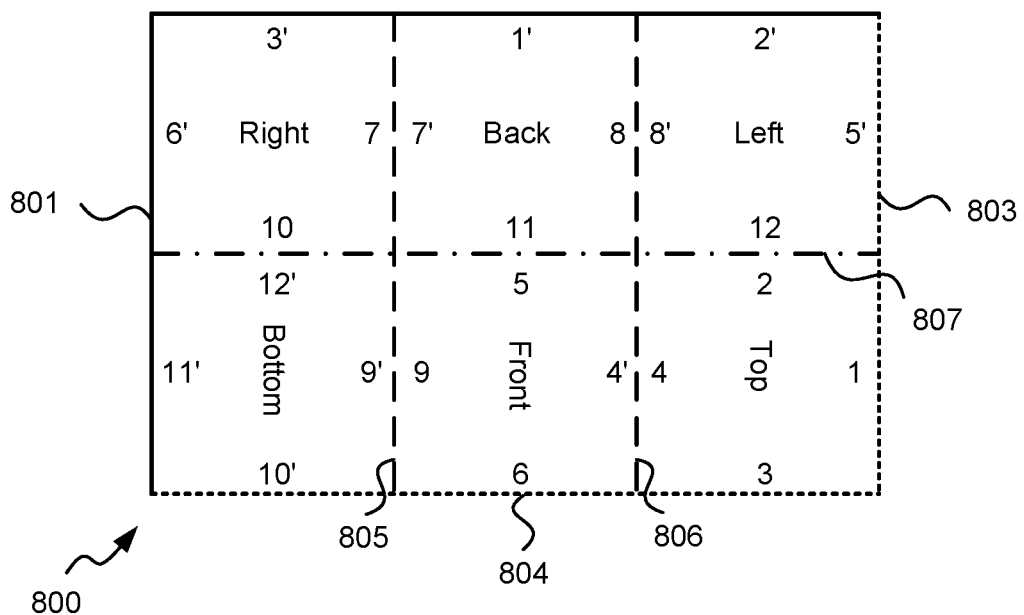
FIG. 8A is a diagram illustrating another example of a 2D representation of spherical video, in accordance with a cube projection format.
Figure 8B:
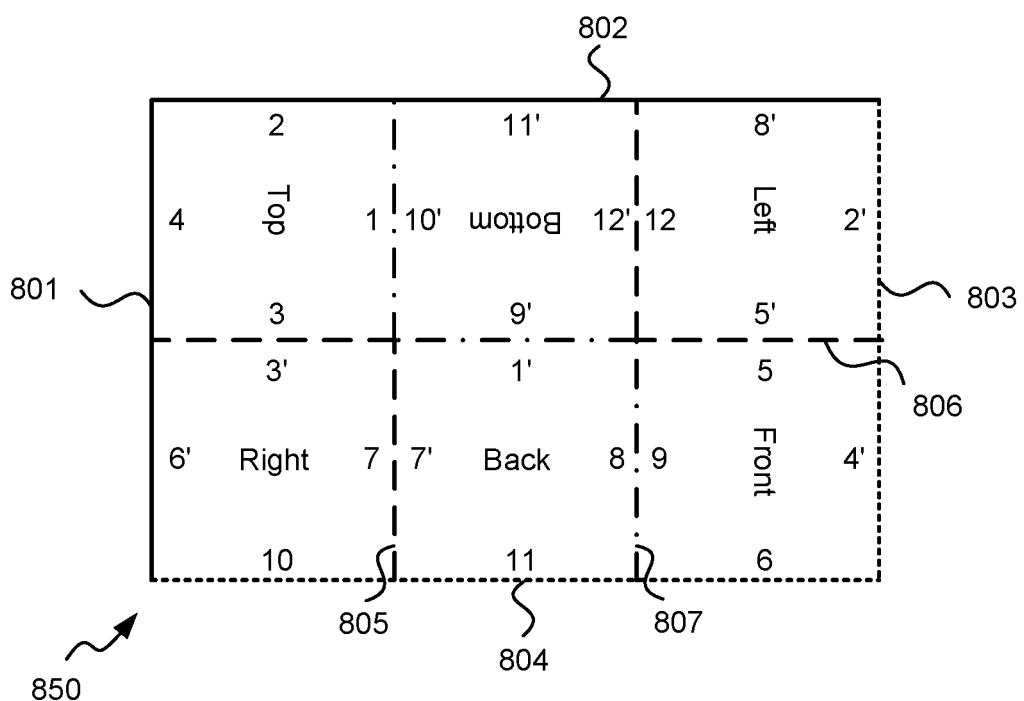
FIG. 8B is a diagram illustrating yet another example of a 2D representation of spherical video, in accordance with a cube projection format.

In the following, the cube format will be used as an example when discussing the disclosed concepts. FIGS. 6A and 6B illustrate an example 600 of the cube projection format. FIGS. 7, 8A and 8B illustrate examples 700, 800 and 850 of 2D representations of spherical video, in accordance with the cube projection format 600. In these examples, the faces comprise front, back, left, right, bottom and top faces. Furthermore, in these examples, face boundaries or edges are marked with consecutive numbers 1 to 12 and further with consecutive numbers 1' to 12', such that a pair of boundaries having a boundary with a given number and another boundary with the same number and an apostrophe constitute adjoining or counterpart boundaries in the 3D cube projection format. For example, boundaries 6 and 6' constitute adjoining boundaries in the 3D cube projection format, as shown in FIG. 6B. Similarly, boundaries 5 and 5' constitute adjoining boundaries in the 3D cube projection format, etc. Herein, the terms boundary and edge are used interchangeably.

When 360-degree content is mapped to a 2D representation, discontinuities are introduced into the content which do not exist on the sphere. FIG. 7 illustrates an example of a non-compact cube layout or 2D representation in which the connectivity of the cube faces is preserved as much as possible. In other words, the cube is unfolded such that all sides are still connected in 2D as they are connected in 3D. However, there are two unused regions in this format, the one on the top right (surrounded by 3, 3', 1' and 2') and the region on the bottom left (surrounded by 10, 10', 11, 12). Because of this, compact cube formats may be more suitable for use, examples of which are shown in FIGS. 8A and 8B.

FIGS. 8A and 8B illustrate different boundary types in compact cube formats and they may be processed during loop-filtering. Continuous boundaries (dashed lines 805, 806) are those between faces that are connected to each other in both the 3D cube projection format and its 2D representation. Discontinuous boundaries (dot-and-dash lines 807) are those between faces that are not connected to each other in the 3D cube projection format but are connected to each other in its 2D representation.

In the examples of FIGS. 8A and 8B, at least some of the face boundaries (dotted lines 803, 804) aligned with the frame borders may not be loop-filtered. Further in the examples of FIGS. 8A and 8B, at least some others of the face boundaries (lines 801, 802) aligned with the frame borders may be loop-filtered.

Accordingly, in the example of FIG. 8A, face boundaries 4 and 4', 7 and 7', 8 and 8', 9 and 9' are continuous, whereas face boundaries 10 and 12', 11 and 5, 12 and 2 are discontinuous boundaries. In the example of FIG. 8B, face boundaries 3 and 3', 7 and 7', 5 and 5', 12 and 12' are continuous, whereas face boundaries 1 and 10', 9' and 1', 8 and 9 are discontinuous boundaries.

The system or apparatus described in FIGS. 1A-5 may be further configured to maintain discontinuous boundary sample information that indicates which samples are located at the one or more discontinuous boundaries. Additionally/alternatively, the system or apparatus described in FIGS. 1A-5 may be configured to maintain reconstruction state information that indicates whether neighboring samples for loop-filtering of the samples indicated by the discontinuous boundary sample information have been reconstructed.

Maintaining the reconstruction state information may be implemented e.g., in one of two ways:
1. On the fly: knowledge of the face arrangement is used along with the processing order of the block (i.e are there slice/tiles). Then it can be derived whether the connected neighboring block(s) has/have been decoded and thus is/are available, or
2. Storing a flag for the block at face boundaries. This may be done at the coding block level. After a block is reconstructed, the flag may be set to true. Loop-filtering can be performed when the flags for all connected neighboring block(s) is/are set to true.

Figure 9:
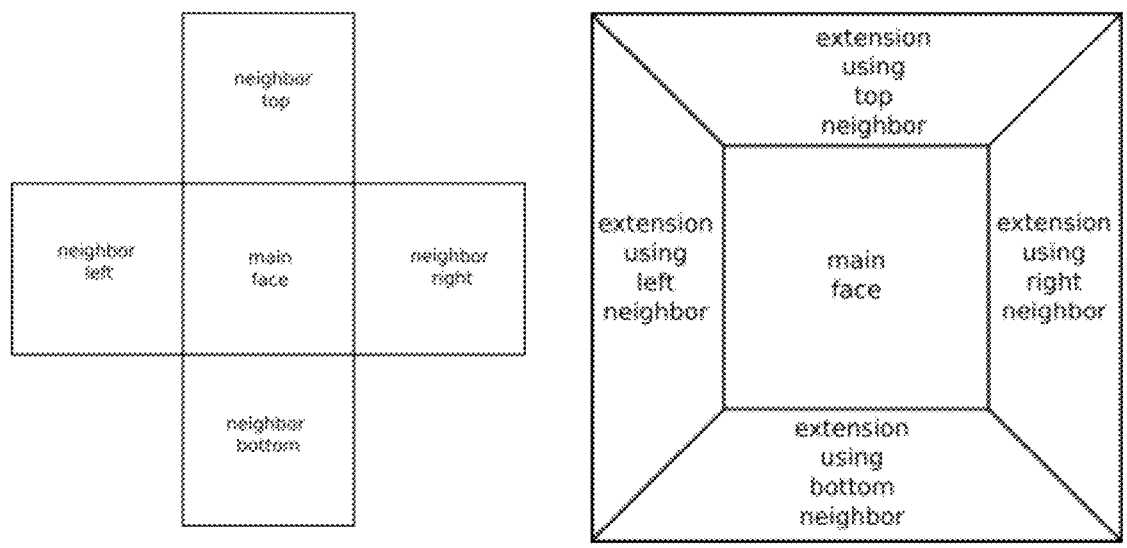
FIG. 9 is a diagram illustrating an example of a cube face being extended.

To improve motion compensation, every cube face (called main face here) is extended using its four neighboring faces (FIG. 9). Here, the term neighbors refers to faces which share boundaries in the assembled cube. Note that they do not necessarily need to share a boundary in the coding arrangement.

One problem that can be addressed with "uncoded" slices is geometry padding for 360° video in cube based projection formats. With geometry padding the Inter prediction performance across face boundaries can be improved. In particular, in the embodiments of the invention, the one or more slices not holding coded picture data may hold padding data for such geometry padding.

Geometry padding can be implemented at block level, by detecting, when a motion vector crosses a face boundary and projecting the required samples on the fly. But this has the problem, that it affects the video coding scheme at a block level for a tool which is only required for a specific kind of content.

A much simpler implementation is to have a separate reference picture for each cube face and choose the used picture based on the location of the block. This high-level approach requires a big amount of additional memory, 6 reference pictures instead of one. Note that also for this case a low level change is required: change of the used picture based on the location of the block.

A picture level approach may be used to do the geometry padding at both encoder and decoder. To reduce the required memory, each coded_face is surrounded in the picture buffer with a region of samples, which is not encoded, but only used for the generation of the geometry padding. In order to enable the generation of such a regions, "uncoded" slices are used in this disclosures.

Figure 10A:
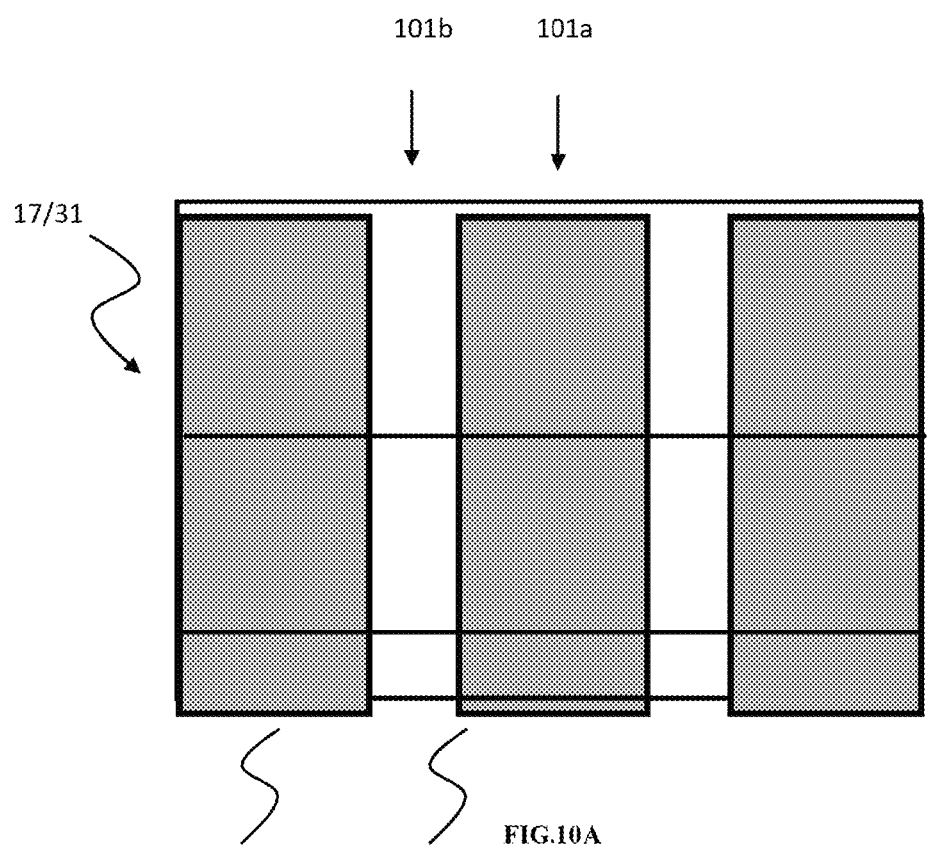
FIG. 10A is a diagram illustrating an example of an arrangement.

FIG. 10A is a diagram illustrating an example of an arrangement including padding space (for encoding or decoding). A picture 17/31 may be partitioned into one or more slices 101a, 101b. A picture 17/31 includes one or more slices 101a holding coded picture data. A picture 17/31 may include one or more slices 101b not holding coded picture data. The slices 101a, 101b may be rectangular. The slices 101a, 101b may span vertically across the picture, or may span horizontally across the picture. Each slice 101a, 101b may comprise one or more tiles 102. The tiles 102 may hold coded picture data (dark part) or may not hold coded picture data (white part). In FIG. 10A, as an example, if a tile 102 of a slice 101a/101b holds/does not hold coded picture data, the complete slice 101a/101b, respectively, holds/does not hold coded picture data. For example, the padded cube faces can be placed in the picture buffer, such that only the main face is a coded tile 102 (dark part), while the padding areas are located in "uncoded" slices 101b (white part). At FIG. 10A, which shows cube face arrangement of faces including padding space, the dark part represents the main face(s), and need to be coded (tiles 102 holding coded picture data); while the white part represents padding region(s), and do not need to be coded, but can be coded.

Figure 10B:
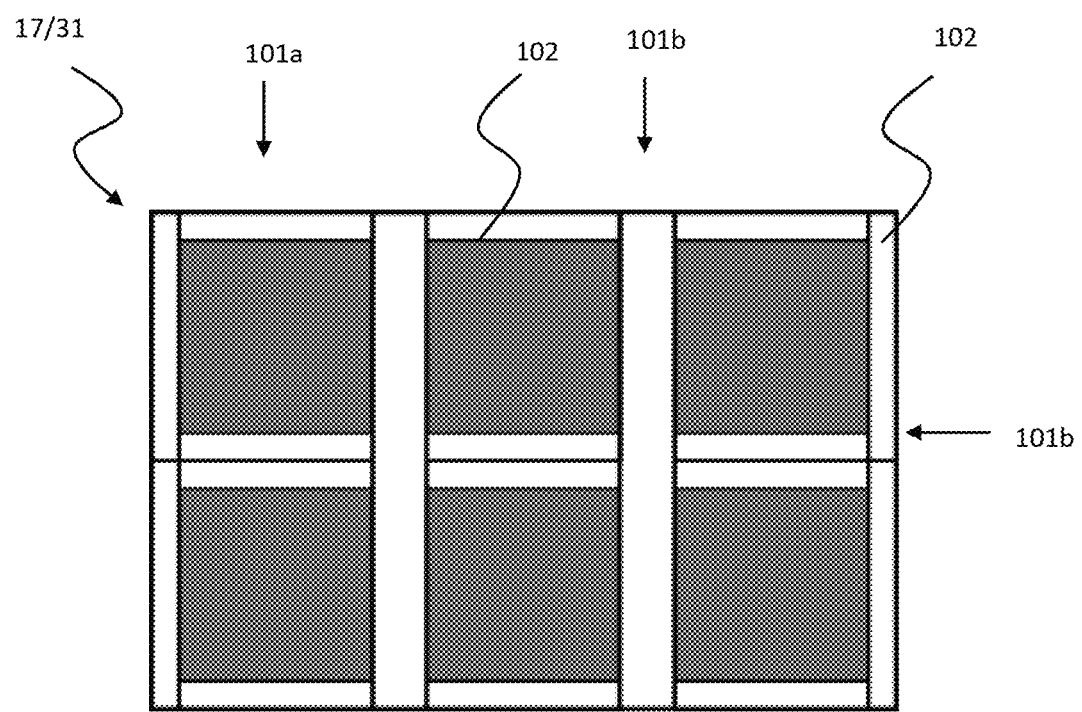
FIG. 10B is a diagram illustrating an example of an arrangement including padding space.

FIG. 10B is a diagram illustrating another example of an arrangement including padding space. As in FIG. 10A, a picture 17/31 may be partitioned into one or more slices 101a, 101b. Again, slices 101a, 101b may be rectangular, and/or slices 101, 101b may span vertically across the picture or may span horizontally across the picture, and/or each slice 101a, 101b may comprise one or more tiles 102. In the example of FIG. 10B, the padded cube faces can be placed in the picture buffer, such that only the main face is a coded tile 102, while the padding areas are located in "uncoded" slices 101b. At FIG. 10 which shows cube face arrangement of faces including padding space, the dark part represents the main face(s), and need to be coded; while the white part represents padding region(s), and does not need to be coded. The dark part may be called tiles 102 or slices 101a holding coded picture data. The white part may be called "uncoded" tiles 102 or slices 101b, or may be called tiles 102 or slices 101b not holding coded picture data.

This enables a very simple description of other processes, which can make use of the padding space:
Geometry padding can be performed at buffer level. Inter prediction process at CTU level does not need to be modified.
Face boundary filtering can be performed by filling the padding regions with the non-reprojected samples of the 3D neighbors and applying loop filters across the face boundary. Geometry corrected Intra prediction could also be applied by filling the padding regions with the non reprojected samples of the 3D neighbors before a tile is decoded.

Signaling of Uncoded Regions:
JVET-N1001-v6 ("Versatile Video Coding (Draft 5)") can be used as a basis. However, embodiments of the invention are not limited thereto. Embodiments of the invention may include—on the decoding side—a device 400 for decoding, a method 120 for decoding, and a decoder 30, respectively. Embodiments of the invention include—on the encoding side—a device 400 for encoding, a method 110 for encoding, and an encoder 20, respectively.

The draft supports the partitioning of a picture into rectangular slices. Embodiments of the invention are accordingly configured partition the picture 17/31 into one or more slice 101a, 101b. The one or more slices 101a, 101b may be formed rectangular. Each slice 101a, 101b may comprises one or more tiles 102. One or more slices 101a may hold coded picture data. Further, the one or more slices 101a holding coded picture data may form a subpicture, wherein the subpicture covers a rectangular region of the picture 17/31. Embodiments of the invention support uncoded regions with tile granularity. In particular, one or more slices 101b may not hold coded picture data. For bitstream conformance embodiments may (but not limited thereto) consider the following constraints:

- If a tile 102 in a slice 101a is encoded, the whole slice 101a is in a coded region. In particular, if at least one tile 102 in a given slice 101a holds coded picture data, the whole given slice 101a holds coded picture data.
- If an uncoded tile 102 is part of a slice 101b, the whole slice 101b is an uncoded region. In particular, if at least one tile 102 in a given slice 101b does not hold coded picture data, the whole given slice 101b does not hold coded picture data.
- Slices 101b which hold uncoded regions are omitted from the bitstream 21. However, a device 20 for encoding may also encode the one or more slices 101b not holding coded picture data.
- Slices 101b which hold uncoded regions, in particular the one or more slices 101b not holding coded picture data, may hold padding data for geometry padding or may hold slice header data (compare, for example, the below table).

A possible syntax and semantics for signaling uncoded regions is given below (changes to JVET-N1001-v6 marked in italic). Other embodiments may use different syntax and semantics.

Signaling of Uncoded Tiles or Slices:

Below Describes the Picture Parameter Set RBSP Syntax

| | Descriptor |
|---|---|
| pic_parameter_set_rbsp( ) { | |
|   pps_pic_parameter_set_id | ue(v) |
|   pps_seq_parameter_set_id | ue(v) |
|   output_flag_present_flag | u(1) |
|   single_tile_in_pic_flag | u(1) |
|   if( !single_tile_in_pic_flag) { | |
|     uniform_tile_spacing_flag | u(1) |
|     if( uniform_tile_spacing_flag ) { | |
|       tile_cols_width_minus1 | ue(v) |
|       tile_rows_height_minus1 | ue(v) |
|     } else { | |
|       num_tile_columns_minus1 | ue(v) |
|       num_tile_rows_minus1 | ue(v) |
|       for( i = 0; i < num_tile_columns_minus1; i++ ) | |
|         tile_column_width_minus1[ i ] | ue(v) |
|       for( i = 0; i < num_tile_rows_minus1; i++ ) | |
|         tile_row_height_minus1[ i ] | ue(v) |
|     } | |
|     *allow_uncoded_areas_flag* | u(1) |
|     *if( allow_uncoded_areas_flag ) {* | |
|       *for( i = 0; 1 < NumTilesInPic; i++ ) {* | |
|         *tile_is_coded_flag[ i ]* | u(1) |
|       *}* | |
|     *}* | |
|     brick_splitting_present_flag | u(1) |
|     for( i = 0; brick_splitting_present_flag && i < NumTilesInPic; i++ ) { | |
|       brick_split_flag[ i ] | u(1) |
|       if( brick_split_flag[ i ] ) { | |
|     uniform_brick_spacing_flag[ i ] | u(1) |
|     if( uniform_brick_spacing_flag[ i ] ) | |
|       brick_height_minus1[ i ] | ue(v) |
|     else { | |
|       num_brick_rows_minus1[ i ] | ue(v) |
|       for( j = 0; j < num_brick_rows_minus1[ i ]; j++ ) | |
|         brick_row_height_minus1[ i ][ j ] | ue(v) |
|       } | |
|     } | |
|   } | |
|   single_brick_per_slice_flag | u(1) |
|   if( !single_brick_per_slice_flag ) | |
|     rect_slice_flag | u(1) |
|   if( rect_slice_flag && !single_brick_per_slice_flag ) { | |
|     num_slices_in_pic_minus1 | ue(v) |
|     for( i = 0; i <= num_slices_in_pic_minus1; i++ ) { | |
|       if( i > 0 ) | |
|         top_left_brick_idx[ i ] | u(v) |
|       bottom_right_brick_idx_delta[ i ] | u(v) |
|     } | |
|   } | |
|   loop_filter_across_bricks_enabled_flag | u(1) |
|   if( loop_filter_across_bricks_enabled_flag ) | |

| | Descriptor |
|---|---|
|       loop_filter_across_slices_enabled_flag | u(1) |
|     } | |
|     if( rect_slice_flag ) { | |
|       signalled_slice_id_flag | u(1) |
|       if( signalled_slice_id_flag ) { | |
|         signalled_slice_id_length_minus1 | ue(v) |
|         for( i = 0; i <= num_slices_in_pic_minus1; i++ ) | |
|           slice_id[ i ] | u(v) |
|       } | |
|     } | |
|     entropy_coding_sync_enabled_flag | u(1) |
|     cabac_init_present_flag | u(1) |
|     for( i = 0; i < 2; i++) | |
|       num_ref_idx_default_active_minus1[ i ] | ue(v) |
|     rpl1_idx_present_flag | u(1) |
|     init_qp_minus26 | se (v) |
|     transform_skip_enabled_flag | u(1) |
|     if( transform_skip_enabled_flag ) | |
|       log2_transform_skip_max_size_minus2 | ue(v) |
|     cu_qp_delta_enabled_flag | u(1) |
|     if( cu_qp_delta_enabled_flag ) | |
|       cu_qp_delta_subdiv | ue(v) |
|     pps_cb_qp_offset | se (v) |
|     pps_cr_qp_offset | se (v) |
|     pps_slice_chroma_qp_offsets_present_flag | u(1) |
|     weighted_pred_flag | u(1) |
|     weighted_bipred_flag | u(1) |
|     deblocking_filter_control_present_flag | u(1) |
|     if( deblocking_filter_control_present_flag ) { | |
|       deblocking_filter_override_enabled_flag | u(1) |
|       pps_deblocking_filter_disabled_flag | u(1) |
|       if( !pps_deblocking_filter_disabled_flag ) { | |
|         pps_beta_offset_div2 | se (v) |
|         pps_tc_offset_div2 | se (v) |
|       } | |
|     } | |
|     pps_loop_filter_across_virtual_boundaries_disabled_flag | u(1) |
|     if( pps_loop_filter_across_virtual_boundaries_disabled_flag ) { | |
|       pps_num_ver_virtual_boundaries | u(2) |
|       for( i = 0; i < pps_num_ver_virtual_boundaries; i++ ) | |
|         pps_virtual_boundaries_pos_x[ i ] | u(v) |
|       pps_num_hor_virtual_boundaries | u(2) |
|       for( i = 0; i < pps_num_hor_virtual_boundaries; i++ ) | |
|         pps_virtual_boundaries_pos_y[ i ] | u(v) |
|     } | |
|     pps_extension_flag | u(1) |
|     if( pps_extension_flag ) | |
|       while( more_rbsp_data( ) ) | |
|         pps_extension_data_flag | u(1) |
|     rbsp_trailing_bits( ) | |
| } | |
| slice_header( ) { | |
|     slice_pic_parameter_set_id | ue(v) |
|     *if( rect_slicej_flag \|\| NumBricksInPic > 1 \|\| allow_uncoded_areas_flag )* | |
|       slice_address | u(v) |
|     if( !rect_slice_flag && !single_brick_per_slice_flag ) | |
|       num_bricks_in_slice_minus1 | ue(v) |
|     slice_type | ue(v) |
|     if( NalUnitType = = GRA_NUT ) | |
|       recovery_poc_cnt | se(v) |
|     slice_pic_order_cnt_lsb | u(v) |
|     if( NalUnitType = = IDR_W_RADL \|\| NalUnitType = = IDR_N_LP \|\| | |
|       NalUnitType = = CRA_NUT ) | |
|       no_output_of_prior_pics_flag | u(1) |
|     if( output_flag_present_flag ) | |
|       pic_output_flag | u(1) |
|     if( ( NalUnitType != IDR_W_RADL && NalUnitType != ID_N_LP ) \|\| | |
|       sps_idr_rpl_present_flag ) { | |
|       for( i = 0; i < 2; i++ ) { | |
|         if( num_ref_pic_lists_in_sps[ i ] > 0 && | |
|           ( i = = 0 \|\| ( i = = 1 && rpl1_idx_present_flag ) ) ) | |
|           ref_pic_list_sps_flag[ i ] | u(1) |
|         if( ref_pic list sps flag[ i ] ) { | |
|           if( num_ref_pic_lists_in_sps[ i ] > 1 && | |
|             ( i = = 0 \|\| ( i = = 1 && rpl1_idx_present_flag ) ) ) | |

-continued

| | Descriptor |
|---|---|
| ref_pic_list_idx[ i ] | u(v) |
| }else | |
| ref_pic_list_struct( i, num_ref_pic_lists_in_sps[ i ] ) | |
| for( j = 0; j < NumLtrpEntries[ i ][ RplsIdx[ i ] ]; j++ ) { | |
| if( ltrp_in_slice_header_flag[ i ][ RplsIdx[ i ] ] ) | |
| slice_poc_lsb_lt[ i ][ j ] | u(v) |
| delta_poc_msb_present_flag[ i ][ j ] | u(1) |
| if( delta_poc_msb_present_flag[ i ][ j ] ) | |
| delta_poc_msb_cycle_lt[ i ][ j ] | ue(v) |
| } | |
| } | |
| if( ( slice_type != I && num_ref_entries[ 0 ][ RplsIdx[ 0 ] ] > 1 ) \|\| | |
| ( slice_type = = B && num_ref_entries[ 1 ][ RplsIdx [ 1 ] ] > 1 ) ) { | |
| num_ref_idx_active_override_flag | u(1) |
| if( num_ref_idx_active_override_flag ) | |
| for( i = 0; i < ( slice_type = = B ? 2: 1 ); i++ ) | |
| if( num_ref_entries[ i ][ RplsIdx[ i ] ] > 1 ) | |
| num_ref_idx_active_minus1[ i ] | ue(v) |
| } | |
| } | |
| if( partition_constraints_override_enabled_flag ) { | |
| partition_constraints_override_flag | ue(v) |
| if( partition_constraints_override_flag) { | |
| slice_log2_diff_min_qt_min_cb_luma | ue(v) |
| slice_max_mtt_hierarchy_depth_luma | ue(v) |
| if( slice_max_mtt_hierarchy_depth_luma != 0 ) | |
| slice_log2_diff_max_bt_min_qt_luma | ue(v) |
| slice_log2_diff_max_tt_min_qt_luma | ue(v) |
| } | |
| if( slice_type = = I && qtbtt_dual_tree_intra_flag) { | |
| slice_log2_diff min_qt_min_cb_chroma | ue(v) |
| slice_max_mtt_hierarchy_depth_chroma | ue(v) |
| if( slice_max_mtt_hierarchy_depth_chroma != 0 ) | |
| slice_log2_diff max_bt_min_qt_chroma | ue(v) |
| slice_log2_diff max_tt_min_qt_chroma | ue(v) |
| } | |
| } | |
| } | |
| } | |
| if( slice_type != I ) { | |
| if( sps_temporal_mvp_enabled_flag ) | |
| slice_temporal_mvp_enabled_flag | u(1) |
| if( slice_type = = B ) | |
| mvd_l1_zero_flag | u(1) |
| if( cabac_init_present_flag ) | |
| cabac_init_flag | u(1) |
| if( slice_temporal_mvp_enabled_flag ) { | |
| if( slice_type = = B ) | |
| collocated_from_l0_flag | u(1) |
| } | |
| if( ( weighted_pred_flag && slice_type = = P ) \|\| | |
| (weighted_bipred_flag && slice_type = = B ) ) | |
| pred_weight_table( ) | |
| six_minus_max_num_merge_cand | ue(v) |
| if( sps_affine_enabled_flag ) | |
| five_minus_max_num_subblock_merge_cand | ue(v) |
| if( sps_fpel_mmvd_enabled_flag ) | |
| slice_fpel_mmvd_enabled_flag | u(1) |
| if( sps_triangle_enabled_flag && MaxNumMergeCand >= 2 ) | |
| max_num_merge_cand_minus_max_num_triangle_cand | ue(v) |
| } else if ( sps_ibc_enabled_flag ) | |
| six_minus_max_num_merge_cand | ue(v) |
| slice_qp_delta | se(v) |
| if( pps_slice_chroma_qp_offsets_present_flag ) { | |
| slice_cb_qp_offset | se(v) |
| slice_cr_qp_offset | se(v) |
| } | |
| if( sps_sao_enabled flag ) { | |
| slice_sao_luma_flag | u(1) |
| if( ChromaArrayType != 0 ) | |
| slice_sao_chroma_flag | u(1) |
| } | |
| if( sps_alf_enabled_flag ) { | |
| slice_alf_enabled_flag | u(1) |
| if( slice_alf_enabled_flag ) { | |

|  | Descriptor |
|---|---|
| num_alf_aps_ids | tb(v) |
| for( i = 0; i < num_alf_aps_ids; i++ ) | |
|     slice_alf_aps_id_luma[ i ] | u(5) |
| slice_alf_chroma_idc | tu(v) |
| if( slice_alf_chroma_idc && ( slice_type != I \|\| num_alf_aps_ids != 1) ) | |
|     slice_alfaps_id_chroma | u(5) |
| } | |
| } | |
| dep_quant_enabled_flag | u(1) |
| if( !dep_quant_enabled_flag ) | |
|   sign_data_hiding_enabled_flag | u(1) |
| if( deblocking_filter_override_enabled_flag ) | |
|   deblocking_filter_override_flag | u(1) |
| if( deblocking_filter_override_flag ) { | |
|   slice_deblocking_filter_disabled_flag | u(1) |
|   if( !slice_deblocking_filter_disabled_flag ) { | |
|     slice_beta_offset_div2 | se(v) |
|     slice_tc_offset_div2 | se(v) |
|   } | |
| } | |
| if( sps_lmcs_enabled_flag ) { | |
|   slice_lmcs_enabled_flag | u(1) |
|   if( slice_lmcs_enabled_flag) { | |
|     slice_lmcs_aps_id | u(5) |
|     if( !( qtbtt_dual_tree_intra_flag && slice type = = I ) ) | |
|     slice_chroma_residual_scale_flag | u(1) |
| } | |
| if ( entropy_coding_sync_enabled_flag ) | |
|   num_entry_point_offsets | ue(v) |
| if( NumEntlyPoints > 0 ) { | |
|   offset_len_minus1 | ue(v) |
|   for( i = 0; i < NumEntryPoints; i++ ) | |
|     entry_point_offset_minus1[ i ] | u(v) |
| } | |
| byte_alignment( ) | |
| } | | allow_uncoded_areas_flag equal to 1 specifies that one or more tiles of pictures referring to the PPS may be uncoded. allow_uncoded_areas_flag equal to 0 specifies that no tiles of pictures referring to the PPS are uncoded.

tile_is_coded_flag[i] equal to 1 specifies that the tile with id i holds CTU data. tile_is_coded_flag equal to 0 specifies that the tile with id i holds no CTU data. The corresponding region in the buffer is empty and initialized to a constant value of $(1<<(BitDepth_y-1))$ for the Luma component and $(1<<(BitDepth_C-1))$ for the chroma components, if present.

When tile_is_coded_flag is not present, it is inferred to be equal to 1.

For a conformant bitstream each coded slice entirely consists of coded tiles, i.e. tile_is_coded_flag has to be 1 for each tile in a coded slice (slices which consist entirely of uncoded tiles are not encoded in the bistream at all).

An alternative to the above-described "Signaling of uncoded regions" is described below, in particular, an example for signaling of empty tiles is described:

Below describes the Picture parameter set RBSP syntax

|  | Descriptor |
|---|---|
| pic_parameter_set_rbsp( ) { | |
|   pps_pic_parameter_set_id | ue(v) |
|   pps_seq_parameter_set_id | ue(v) |
| transform_skip_enabled_flag | u(1) |
| single_tile_in_pic_flag | u(1) |
| if( !single_tile_in_pic_flag ) { | |
|   num_tile_columns_minus1 | ue(v) |
|   num_tile_rows_minus1 | ue(v) |
|   uniform_tile_spacing_flag | u(1) |
|   if( !uniform_tile_spacing_flag ) { | |
|     for( i = 0; i < num_tile_columns_minus1; i++ ) | |
|       tile_column_width_minus1[ i ] | ue(v) |
|     for( i = 0; i < num_tile_rows_minus1; i++ ) | |
|       tile_row_height_minus1[ i ] | ue(v) |
|   } | |
|   loop_filter_across_tiles_enabled_flag | u(1) |
| } | |
| if( sps_360_video_enabled_flag ) { | |
|   pps_360_video_geometry_type | u(3) |
|   if( pps_360_video_geometry_type == FORMAT_360_CMP \|\| | |
|     pps_360_video_geometry_type == FORMAT_360_EAC \|\| | |
|     pps_360_video_geometry_type == FORMAT_360_HEC ) { | |
|     unit_cube_packing_width | u(32) |
|     unit_cube_packing_height | u(32) |
|     coded_cube_packing_width | u(16) |
|     coded_cube_packing_height | u(16) |
|     for( i = 0; i < num_cube_face_equal_to_6; i++ ) { | |
|       unit_face_top[ i ] | u(32) |
|       unit_face_left[ i ] | u(32) |
|       coded_face_width[ i ] | u(16) |
|       coded_face_height[ i ] | u(16) |
|       coded_face_top[ i ] | u(16) |

-continued

|  | Descriptor |
|---|---|
| coded_face_left[ i ] | u(16) |
| cube_face_transform_type[ i ] | u(3) |
| cube_face_padding_size[ i ] | u(16) |
| } | |
| } | |
| } | |
| rbsp_trailing_bits( ) | |
| } | | sps_360_video_enabled_flag equal to 1 specifies that 360° geometry is signalled and 360° coding tools may be used for the video. sps_360_video_enabled_flag equal to specifies that no 360° geometry is signalled and no 360° coding tools are used for the video.

pps_360_video_geometry_type specifies the geometry type of the 360° video. The values of pps_360_video_geometry_type are specified in Table 1.

TABLE 1

Interpretation of pps_360_video_geometry_type

| Value | Description |
|---|---|
| 0 | equirectangular projection |
| 1 | cubemap projection/FORMAT_360_CMP |
| 2 | hybrid equiangular cubemap projection/FORMAT_360_HEC |
| 3 | equiangular cubemap projection/FORMAT_360_EAC | unit_cube_packing_width and unit_cube_packing_height specify the width and height, respectively, of the projected picture, in relative projected picture sample units.
The values of unit_cube_packing_width and unit_cube_packing_height shall both be greater than 0.
unit_cube_packing_width divided by 3 shall be equal to unit_cube_packing_height divided by 2.
coded_cube_packing_width and coded_cube_packing_height specify the width and height, respectively, of the packed cube faces, in relative packed picture sample units. The values of packed_picture_width and packed_picture_height shall both be greater than 0.
cube_face_transform_type[i] specifies the rotation and mirroring to be applied to the i-th cube face to remap to the i-th unit cube face. When the conversion is from coded cube face to unit cube face and cube_face_transform_type[i] specifies both rotation and mirroring, rotation applies before mirroring.

When the conversion is from unit cube face to coded cube face and cube_face_transform_type[i] specifies both rotation and mirroring, mirroring applies before rotation. Further rotation angles are negative in this case.

The values of cube_face_transform_type[i] are specified in Table 2.

TABLE 2 cube_face_transform_type[ i ] values

| Value | Description |
|---|---|
| 0 | no transform |
| 1 | mirroring horizontally |
| 2 | rotation by 180 degrees (anticlockwise) |
| 3 | rotation by 180 degrees (anticlockwise) before mirroring horizontally |

TABLE 2-continued cube_face_transform_type[ i ] values

| Value | Description |
|---|---|
| 4 | rotation by 90 degrees (anticlockwise) before mirroring horizontally |
| 5 | rotation by 90 degrees (anticlockwise) |
| 6 | rotation by 270 degrees (anticlockwise) before mirroring horizontally |
| 7 | rotation by 270 degrees (anticlockwise) | coded_face_width[i] specifies the width of the i-th cube face in units of luma samples. coded_face_width[i] shall not be equal to 0 and shall be an integer multiple of MinCbSizeY. coded_face_width[i] shall be smaller than pic_width_in_luma_samples.
coded_face_height[i] specifies the height of the i-th cube face in units of luma samples. coded_face_height[i] shall not be equal to 0 and shall be an integer multiple of MinCbSizeY. coded_face_height[i] shall be smaller than pic_height_in_luma_samples.
coded_face_top[i] specifies the top luma sample row of the i-th cube face in units of luma samples. coded_face_top[i] shall be in the range of 0 to pic_height_in_luma_samples.
coded_face_left[i] specifies the left-most luma sample column of the i-th cube face in units of luma samples. coded_face_left[i] shall be in the range of 0 to pic_width_in_luma_samples.
cube_face_padding_size[i] specifies the amount of luma samples in the buffer, by which the i-th cube face is padded on each side. The corresponding tiles in the buffer do not hold coded samples, i.e. the tile_coded_flag must be equal to 0 for these tiles.
unit_face_top[i] and unit_face_left[i] specify the top sample row, and the left-most sample column, respectively, of the i-th projected region within the projected picture.
unit_face_top[i], and unit_face_left[i] are indicated in relative projected picture sample units.

NOTE 1—Two projected regions may not partially or entirely overlap with each other.

A possible syntax and semantics for signaling empty tiles is given below.
Syntax:

|  | Descriptor |
|---|---|
| tile_group_header( ) { | |
|   tile_group_pic_parameter_set_id | ue(v) |
|   if( NumTilesInPic > 1) { | |
|     tile_group_address | u(v) |
|     num_tiles_in_tile_group_minus1 | ue(v) |
|   } | |
|   tile_group_type | ue(v) |
|   if( tile_group type != I ) { | |
|     log2_diff_ctu_max_bt_size | ue(v) |
|     if( sps_sbtmvp_enabled_flag ) { | |
|       sbtmvp_size_override_flag | u(1) |
|       if( sbtmvp_size_override_flag ) | |
|         log2_sbtmvp_active_size_minus2 | u(3) |
|     } | |
|     if( sps_temporal_mvp_enabled flag ) | |
|       tile_group_temporal_mvp_enabled_flag | u(1) |
|     if( tile_group_type = = B ) | |
|       mvd_l1_zero_flag | u(1) |
|     if( tile_group_temporal_mvp_enabled_flag ) { | |
|       if( tile_group_type = = B ) | |
|         collocated_from_l0_flag | u(1) |
|     } | |

-continued

| | Descriptor |
|---|---|
| six_minus_max_num_merge_cand | ue(v) |
| } | |
| dep_quant_enabled_flag | u(1) |
| if( !dep_quant_enabled_flag) | |
|   sign_data_hiding_enabled_flag | u(1) |
| if( num_tiles_in_tile_group_minus1 > 0 ) { | |
|   offset_len_minus1 | ue(v) |
|   for( i = 0; i < num_tiles_in_tile_group_minus1; i++ ) | |
|     tile_coded_flag | u(1) |
|     if( tile_coded_flag ) { | |
|       entry_point_offset_minus1[ i ] | u(v) |
|     } | |
|   } | |
| } | |
| byte_alignment( ) | |
| } | |

Semantics
1. tile_coded_flag equal to 1 specifies that the tile holds CTU data. tile_coded_flag equal to 0 specifies that the tile holds no CTU data. The corresponding region in the buffer is empty. When tile_coded_flag is not present, it is inferred to be equal to 1.

Handling of Loop Filters at Boundaries to Uncoded Areas

Loop filter are disabled across boundaries to uncoded areas. Conditions are added to each loop filter to ensure this. It should be noted that it is still possible to define a new class of loop filters, which treat boundaries of uncoded areas. While the current loop filters can be executed at block level, such new loop filters would have to be executed after the whole picture is reconstructed. In particular, a device according an embodiment of the invention (encoding or decoding) may be configured to disable in-loop filters at boundaries of slices not holding coded picture data.

Deblocking Filter

The deblocking filter process is applied to all coding subblock edges and transform block edges of a picture, except the following types of edges:
  Edges that are at the boundary of the picture,
  Edges that coincide with the virtual boundaries of the picture when pps_loop_filter_across_virtual_boundaries_disabled_flag is equal to 1,
  Edges that coincide with boundaries of uncoded areas when allow_uncoded_areas_flag is equal to 1,
  Edges that coincide with brick boundaries when loop_filter_across_bricks_enabled_flag is equal to 0,
  Edges that coincide with slice boundaries when loop_filter_across_slices_enabled_flag is equal to 0,
  Edges that coincide with upper or left boundaries of slices with slice_deblocking_filter_disabled_flag equal to 1,
  Edges within slices with slice_deblocking_filter_disabled_flag equal to 1,
  Edges that do not correspond to 8×8 sample grid boundaries of the considered component,
  Edges of chroma transform blocks that are not edges of the associated transform unit.

Sample Adaptive Offset

For each coding unit and each coding block per colour component of a coding unit indicated by the colour component index cIdx ranging from firstCompIdx to lastCompIdx, inclusive, with coding block width nCbW, coding block height nCbH and location of top-left sample of the coding block (xCb, yCb), when edgeType is equal to EDGE_VER and xCb % 8 is equal 0 or when edgeType is equal to EDGE_HOR and yCb % 8 is equal to 0, the edges are filtered by the following ordered steps:

1. The variable filterEdgeFlag is derived as follows:
   If edgeType is equal to EDGE_VER and one or more of the following conditions are true, filterEdgeFlag is set equal to 0:
     The left boundary of the current coding block is the left boundary of the picture.
     The left boundary of the current coding block is the left boundary of the brick and loop_filter_across_bricks_enabled_flag is equal to 0.
     The left boundary of the current coding block is the left boundary of the slice and loop_filter_across_slices_enabled_flag is equal to 0.
     The left boundary of the current coding block coincides with the boundary of an uncoded area and allow_uncoded_areas_flag is equal to 1.
     The left boundary of the current coding block is one of the vertical virtual boundaries of the picture and pps_loop_filter_across_virtual_boundaries_disabled_flag is equal to 1.
   Otherwise if edgeType is equal to EDGE HOR and one or more of the following conditions are true, the variable filterEdgeFlag is set equal to 0:
     The top boundary of the current luma coding block is the top boundary of the picture.
     The top boundary of the current coding block is the top boundary of the brick and loop_filter_across_bricks_enabled_flag is equal to 0.
     The top boundary of the current coding block is the top boundary of the slice and loop_filter_across_slices_enabled_flag is equal to 0.
     The top boundary of the current coding block coincides with the boundary of an uncoded area and allow_uncoded_areas_flag is equal to 1.
     The top boundary of the current coding block is one of the horizontal virtual boundaries of the picture and pps_loop_filter_across_virtual_boundaries_disabled_flag is equal to 1.
   Otherwise, filterEdgeFlag is set equal to 1.

Otherwise, if SaoTypeIdx[cIdx][rx][ry] is equal to 2, the following ordered steps apply:
1. The values of hPos[k] and vPos[k] for k=0 . . . 1 are specified in Table 8-21 based on SaoEoClass[cIdx][rx][ry].
2. The variable edgeIdx is derived as follows:
   The modified sample locations $(xS_{ik}', yS_{jk}')$ and $(xY_{ik}', yY_{jk}')$ are derived as follows:

$$(xS_{ik}', yS_{jk}') = (xS_i + hPos[k], yS_j + vPos[k]) \qquad (8\text{-}1158)$$

$$(xY_{ik}', yY_{jk}') = (cIdx==0)?(xS_{ik}', yS_{jk}'):(xS_{ik}'*SubWidthC, yS_{jk}'*SubHeightC) \qquad (8\text{-}1159)$$

If one or more of the following conditions for all sample locations $(xS_{ik}', yS_{jk}')$ and $(xY_{ik}', yY_{jk}')$ with k=0 . . . 1 are true, edgeIdx is set equal to 0:
   The sample at location $(xS_{ik}', yS_{jk}')$ is outside the picture boundaries.
   loop_filter_across_slices_enabled_flag is equal to 0 and the sample at location $(xY_{ik}', yS_{ik}')$ belongs to a different slice.
   loop_filter_across_bricks_enabled_flag is equal to 0 and the sample at location $(xS_{ik}', yS_{jk}')$ belongs to a different brick.
   allow_uncoded_areas_flag is equal to 1 and the sample at location $(xS_{ik}', yS_{jk}')$ belongs to an uncoded area.

Otherwise, edgeIdx is derived as follows:
The following applies:

$$edgeIdx=2+Sign(recPicture[xS_i][yS_j]-recPicture[xS_i+hPos[0]][yS_j+vPos[0]])+Sign(recPicture[xS_i][yS_j]-recPicture[xS_i+hPos[1]][yS_j+vPos[1]]) \quad (8\text{-}1160)$$

When edgeIdx is equal to 0, 1, or 2, edgeIdx is modified as follows:

$$edgeIdx=(edgeIdx==2)?0:(edgeIdx+1) \quad (8\text{-}1161)$$

Adaptive Loop Filter

The locations ($h_{x+i}$, $v_{y+j}$) for each of the corresponding luma samples (x, y) inside the given array recPicture of luma samples with i, j=−3 . . . 3 are derived as follows:
  If allow_uncoded_areas_flag is equal to 1 and the location xCtb−1 belongs to an uncoded area, the following applies:

boundaryPosX=xCtb $$h_{x+i}=Clip3(boundaryPosX,pic\_width\_in\_luma\_samples-1,xCtb+x+i) \quad (8\text{-}1175)$$

Otherwise, if allow_uncoded_areas_flag is equal to 1 and the location xCtb+CtbSizeY belongs to an uncoded area, the following applies:

boundaryPosX=xCtb+CtbSizeY $$h_{x+i}=Clip3(0,boundaryPosX-1,xCtb+x+i) \quad (8\text{-}1176)$$

If allow_uncoded_areas_flag is equal to 1 and the location yCtb−1 belongs to an uncoded area, the following applies:

boundaryPosY=yCtb $$v_{y+j}=Clip3(boundaryPosY,pic\_height\_in\_luma\_samples-1,yCtb+y+j) \quad (8\text{-}1178)$$

Otherwise, if allow_uncoded_areas_flag is equal to 1 and the location yCtb+CtbSizeY belongs to an uncoded area, the following applies:

boundaryPosY=yCtb+CtbSizeY $$v_{y+j}=Clip3(0,boundaryPosY-1,yCtb+y+j) \quad (8\text{-}1179)$$

The locations ($h_{x+i}$, $v_{y+j}$) for each of the corresponding luma samples (x, y) inside the given array recPicture of luma samples with i, j=−2 . . . 5 are derived as follows:
  If allow_uncoded_areas_flag is equal to 1 and the location xCtb−1 belongs to an uncoded area, the following applies:

boundaryPosX=xCtb $$h_{x+i}=Clip3(boundaryPosX,pic\_width\_in\_luma\_samples-1,xCtb+x+i) \quad (8\text{-}1175)$$

Otherwise, if allow_uncoded_areas_flag is equal to 1 and the location xCtb+CtbSizeY belongs to an uncoded area, the following applies:

boundaryPosX=xCtb+CtbSizeY $$h_{x+i}=Clip3(0,boundaryPosX-1,xCtb+x+i)$$

Otherwise, if pps_loop_filter_across_virtual_boundaries_disabled_flag is equal to 1 and xCtb+x−PpsVirtualBoundariesPosX[n] is greater than or equal to 0 and less than 2 for any n=0 . . . pps_num_ver_virtual_boundaries−1, the following applies:

$$h_{x+i}=Clip3(PpsVirtualBoundariesPosX[n],pic\_width\_in\_luma\_samples-1,xCtb+x+i) \quad (8\text{-}1186)$$

Otherwise, if pps_loop_filter_across_virtual_boundaries_disabled_flag is equal to 1 and PpsVirtualBoundariesPosX[n]−xCtb−x is greater than 0 and less than 6 for any n=0 . . . pps_num_ver_virtual_boundaries−1, the following applies:

$$h_{x+i}=Clip3(0,PpsVirtualBoundariesPosX[n]-1,xCtb+x+i) \quad (8\text{-}1187)$$

Otherwise, the following applies:

$$h_{x+i}=Clip3(0,pic\_width\_in\_luma\_samples=1,xCtb+x+i) \quad (8\text{-}1188)$$

If allow_uncoded_areas_flag is equal to 1 and the location yCtb−1 belongs to an uncoded area, the following applies:

boundaryPosY=yCtb $$v_{y+j}=Clip3(boundaryPosY,pic\_height\_in\_luma\_samples-1,yCtb+y+j) \quad (8\text{-}1178)$$

Otherwise, if allow_uncoded_areas_flag is equal to 1 and the location yCtb+CtbSizeY belongs to an uncoded area, the following applies:

boundaryPosY=yCtb+CtbSizeY $$v_{y+j}=Clip3(0,boundaryPosY-1,yCtb+yj) \quad (8\text{-}1179)$$

For the derivation of the filtered reconstructed chroma samples alfPicture[x][y], each reconstructed chroma sample inside the current chroma coding tree block recPicture[x][y] is filtered as follows with x=0 . . . ctbWidthC−1, y=0 . . . ctbHeightC−1:
  The locations ($h_{x+i}$, $v_{y+j}$) for each of the corresponding chroma samples (x, y) inside the given array recPicture of chroma samples with i, j=−2 . . . 2 are derived as follows:
    If allow_uncoded_areas_flag is equal to 1 and the location xCtbC−1 belongs to an uncoded area, the following applies:

boundaryPosXC=xCtbC $$h_{x+1}=Clip3(boundaryPosXC,pic\_width\_in\_luma\_samples/SubWidthC-1,xCtb\ C+x+i) \quad (8\text{-}1175)$$

Otherwise, if allow_uncoded_areas_flag is equal to 1 and the location xCtbC+ctbWidthC belongs to an uncoded area, the following applies:

boundaryPosXC=xCtbC+ctbWidthC $$h_{x+i}=Clip3(0,boundaryPosXC-1,xCtbC+x+i) \quad (8\text{-}1175)$$

Otherwise, if pps_loop_filter_across_virtual_boundaries_disabled_flag is equal to 1 and xCtbC+x−PpsVirtualBoundariesPosX[n]/SubWidthC is greater than or equal to 0 and less than 2 for any n=0 . . . pps_num_ver_virtual_boundaries−1, the following applies:

$$h_{x+i}=Clip3(PpsVirtualBoundariesPosX[n]/SubWidthC,pic\_width\_in\_luma\_samples/SubWidthC-1,xCtbC+x+i) \quad (8\text{-}1225)$$

Otherwise, if pps_loop_filter_across_virtual_boundaries_disabled_flag is equal to 1 and PpsVirtualBoundariesPosX[n]/SubWidthC−xCtbC−x is greater than 0 and less than 3 for any n=0 . . . pps_num_ver_virtual_boundaries−1, the following applies:

$$h_{x+i}=Clip3(0,PpsVirtualBoundariesPosX[n]/SubWidthC-1,xCtbC+x+i) \quad (8\text{-}1226)$$

Otherwise, the following applies:

$h_{x+i}$=Clip3(0,pic_width_in_luma_samples/SubWidthC−1,$xCtbC+x+i$) (8-1227)

If allow_uncoded_areas_flag is equal to 1 and the location yCtbC−1 belongs to an uncoded area, the following applies:

boundaryPos$YC$=$yCtbC$ $v_{y+j}$=Clip3(boundaryPos$YC$,pic_height_in_luma_samples/SubHeightC−1,$yCtbC+y+j$) (8-1178)

Otherwise, if allow_uncoded_areas_flag is equal to 1 and the location yCtbC+ctbHeightC belongs to an uncoded area, the following applies:

boundaryPos$Y$=$yCtbC$+$ctb$HeightC$v_{y+j}$=Clip3(0, boundaryPos$YC$−1,$yCtbC+y+j$) (8-1179)

Figure 11A:
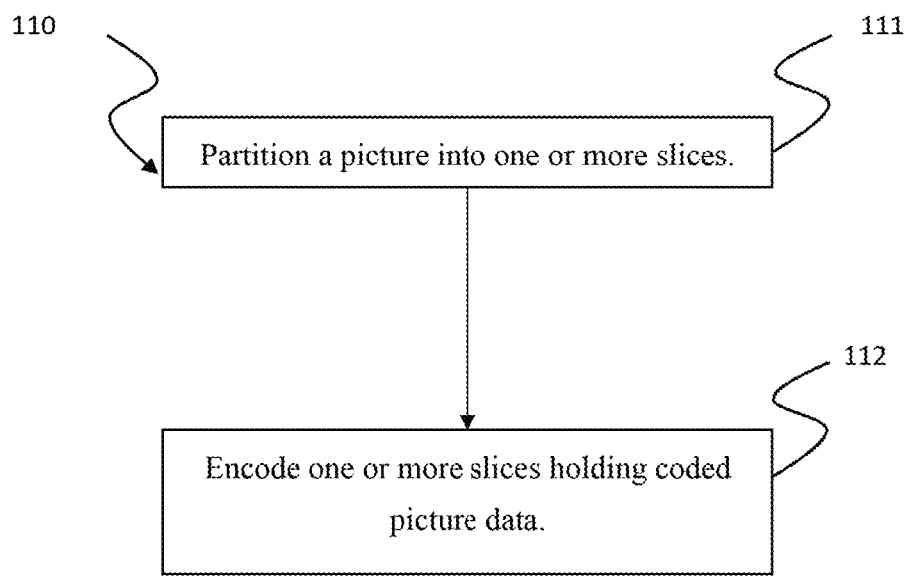
FIG. 11A is a flow diagram of an example method according to an embodiment.

FIG. 11A shows a flow diagram of a method 110 for encoding a picture 17, according to an embodiment. The method 110 may be performed by/in the encoder 20. The method 110 comprises a step 111 of partitioning the picture 17 into one or more slices 101*a*, 101*b*. Each slice 101*a*, 101*b* comprises one or more tiles 102. One or more slices 101*a* hold coded picture data. Further, the method 110 comprises a step 112 of encoding the one or more slices 101*a* holding coded picture data.

Figure 11B:
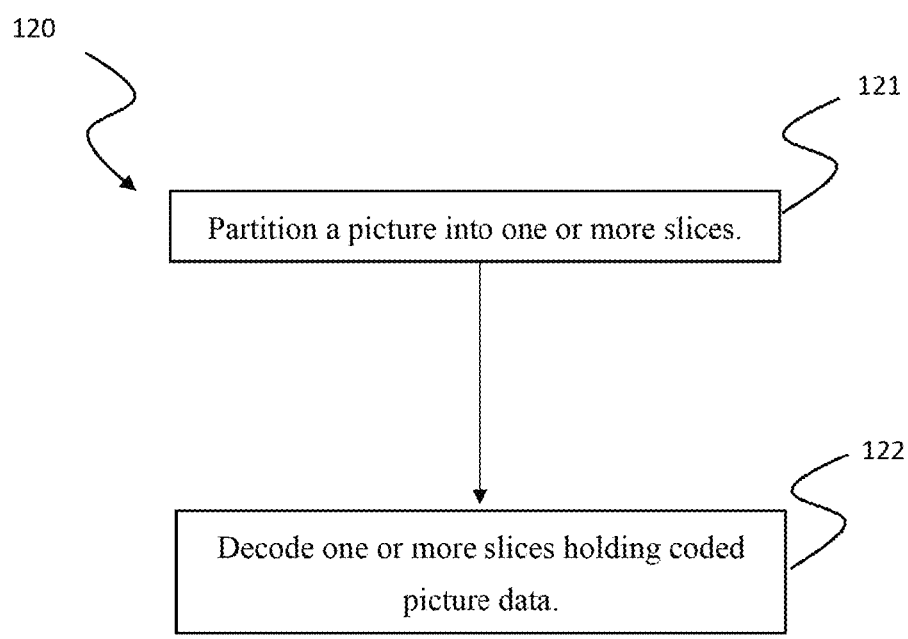
FIG. 11B is a flow diagram of an example method according to an embodiment.
Figure 11C:
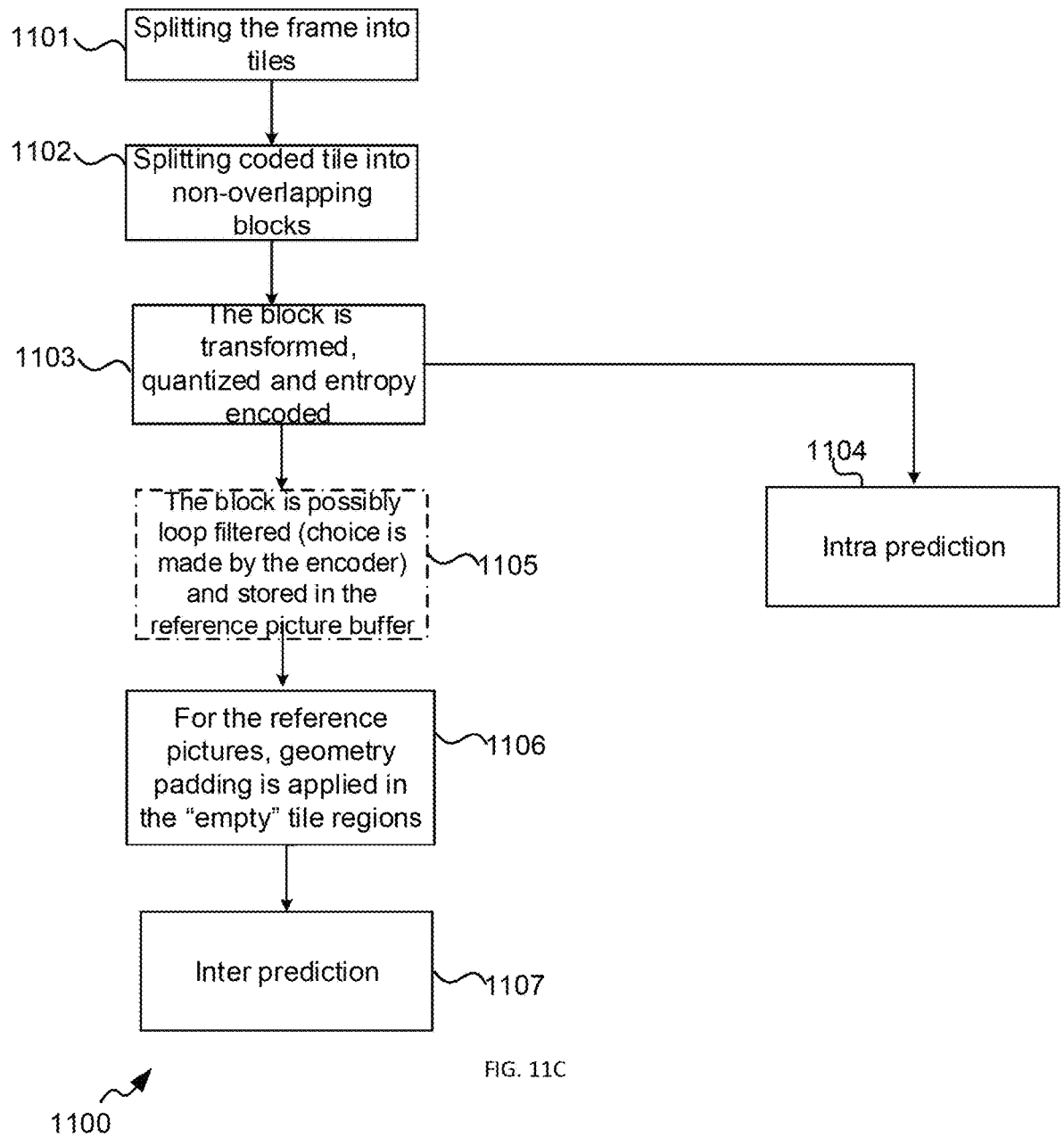
FIG. 11C is a flow diagram of an example method involving picture encoding with the geometry padding using "uncoded" tiles.
Figure 11D:
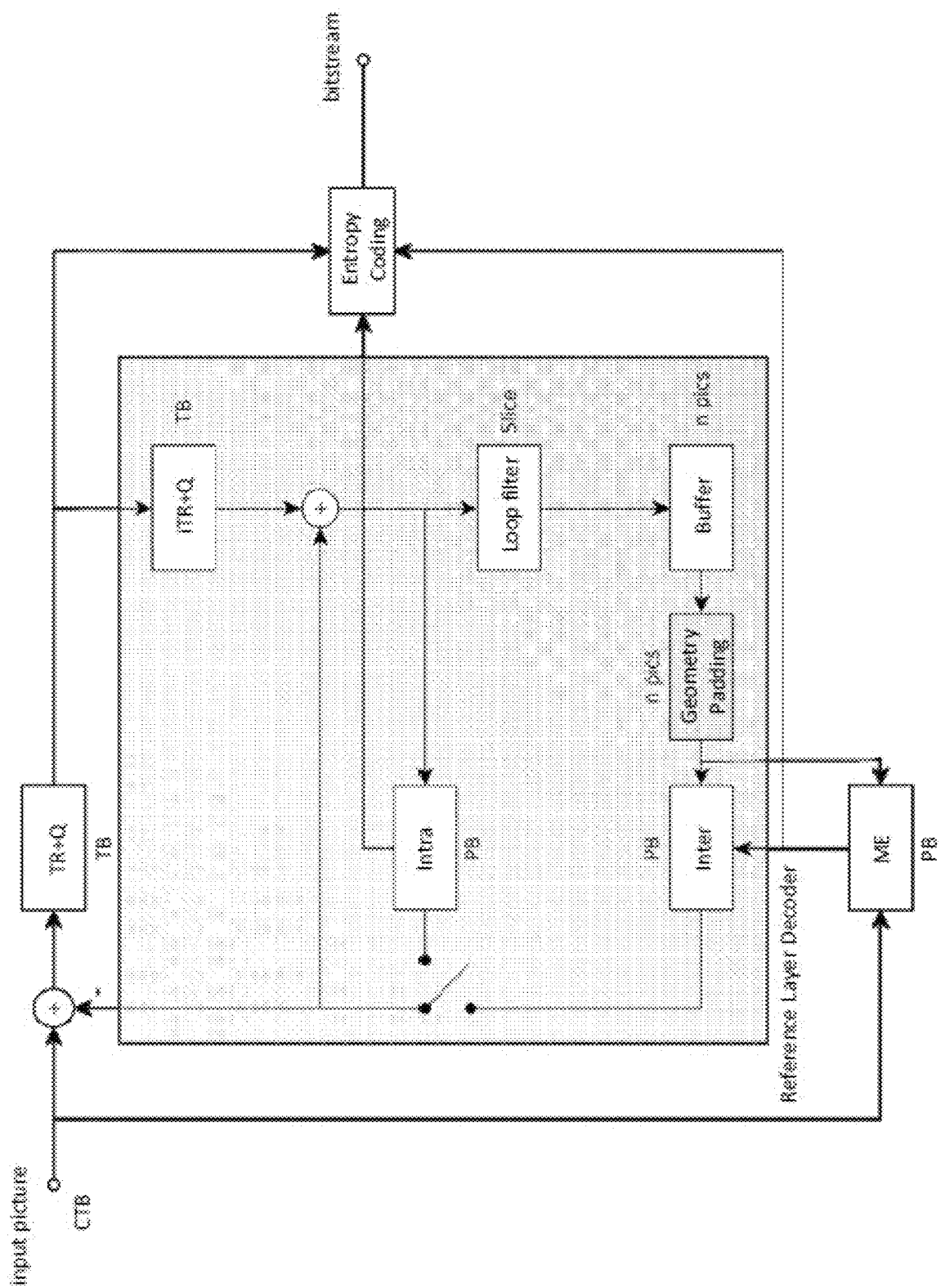
FIG. 11D is a diagram illustrating an example method involving picture encoding with the geometry padding using "uncoded" tiles.

FIG. 11B shows a flow diagram of a method 120 for decoding a picture 31, according to an embodiment. The method 120 may be performed by/in the decoder 30. The method 120 comprises a step 121 of partitioning the picture 31 into one or more slices 101*a*, 101*b*. Each slice 101*a*, 101*b* comprises one or more tiles 102. One or more slices 101*a* hold coded picture data. Further, the method 110 comprises a step 122 of decoding the one or more slices 101*a* holding coded picture data FIG. 11C shows a flow diagram of an example method 1100 involving encoding of pictures with uncoded tiles 102. As also shown in FIG. 11B, the frame is split into tiles 102 at step 1101. Each cube face is represented by one or more tiles 102 which hold coded CTU data. The padding regions (e.g., slices 101*b* not holding coded picture data) are represented by uncoded tiles 102. At step 1102, each coded tile 102 is split into non-overlapping blocks. For each block the predictor block is subtracted. At step 1103, the block is transformed, quantized and entropy encoded. Blocks which have been coded are made available to the encoder by the reference decoder. The reference decoder performs reverse transformation and quantization (here a quantization error may be introduced). At step 1104, the reconstructed block is made available for intra prediction of other blocks in the same frame.

At step 1105, the block is possibly loop filtered (choice is made by the encoder) and stored in the reference picture buffer. At step 1106, this information is also needed by the decoder 30 and hence also entropy coded. Whenever a new picture is encoded, for the reference pictures, geometry padding is applied in the "uncoded" tile 102 regions next to the face boundaries, before motion estimation is performed. At step 1107, it is then also available for inter prediction of other frames. The encoder has to select the block and the mode (intra/inter) which is used as predictor for a particular block.

Figure 12A:
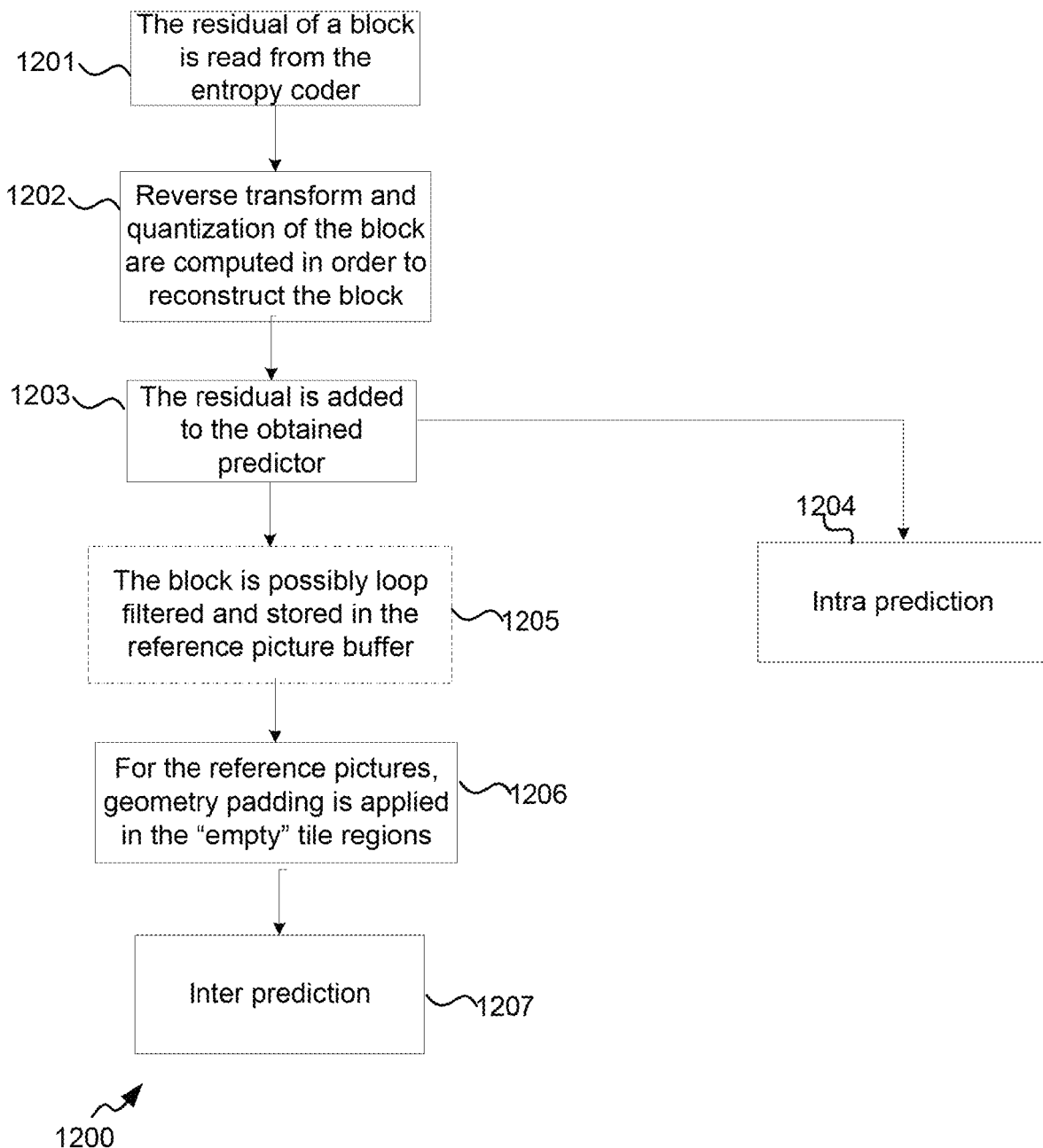
FIG. 12A is a flow diagram of an example method involving picture decoding with the geometry padding using "uncoded" tiles.
Figure 12B:
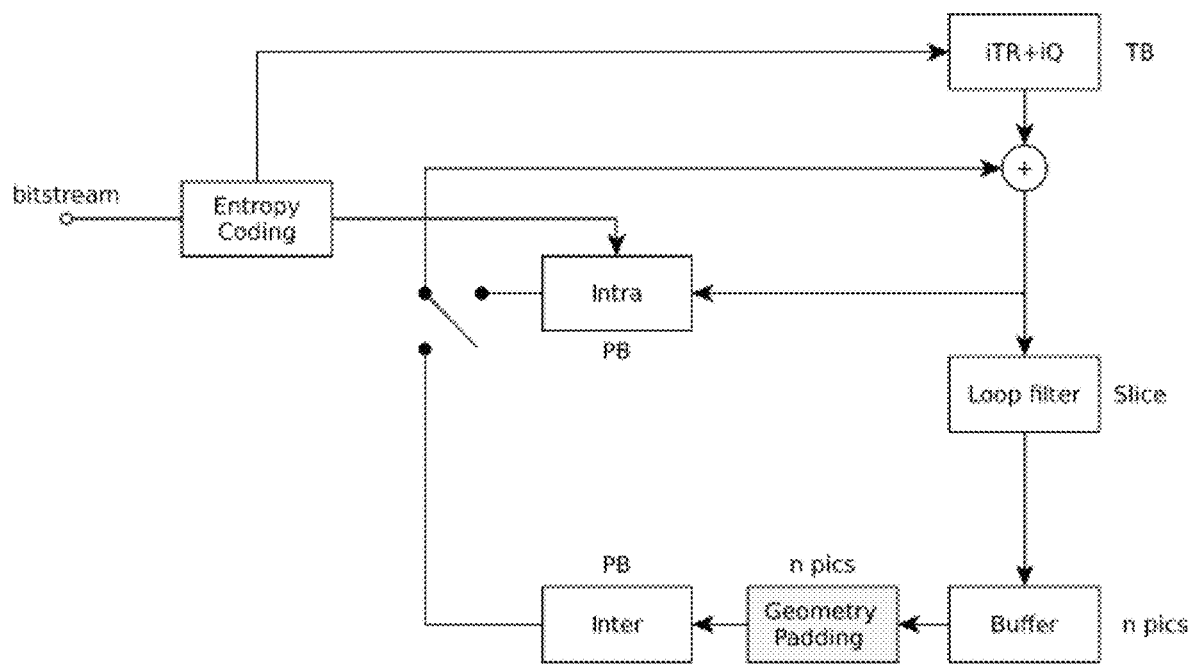
FIG. 12B is a diagram illustrating an example method involving picture decoding with the geometry padding using "uncoded" tiles.

FIG. 12A shows a flow diagram of an example method 1200 involving decoding of pictures with uncoded tiles 102. As also shown in FIG. 12B, for the reference pictures, geometry padding is applied in the "uncoded" tile regions (e.g. slices 101*b* not holding coded picture data) next to the face boundaries, before motion compensation is performed. The frame partitioning of the frame into coded and "uncoded" tiles 102 is decoded. For each block in a coded tile 102 the following is performed: The residual of a block is read from the entropy coder together with the corresponding parameters for inter and intra prediction (step 1201). Reverse transform and quantization of the block are computed in order to reconstruct the block (step 1202). Then the residual is added to the obtained predictor (step 1203). The reconstructed block is made available for intra prediction of other blocks in the same frame (step 1204). Further the block is possibly loop filtered (choice is made by the encoder) and stored in the reference picture buffer (step 1205). At step 1206, this information is also needed by the decoder and hence also entropy coded. Whenever a new picture is decoded, for the reference pictures, geometry padding is applied in the "uncoded" tile 102 regions next to the face boundaries, before motion estimation is performed. At step 1207, it is then also available for inter prediction of other frames. Frames are output in output order from the buffer.

As an example, predictor mentioned in step 1202 (part inter prediction) involves geometry padding and uncoded tiles to perform motion compensation across discontinuous face boundaries. Loop filter involves geometry padding and uncoded tiles as well to perform loop filtering across discontinuous face boundaries, for example, at steps 1206 and 1207.

Below describes reference picture geometry padding process for 360° video:

A.1.2 Reference Picture Geometry Padding Process for 360° Video

Input to this process is a pic_width_in_luma_samples by pic_height_in_luma_samples array of luma samples refPicLXL and two PicWidthlnSamplesC by PicHeightInSamplesC arrays of chroma samples refPicLXCb and refPicLXCr.

A.1.2.1.1 Generation of Luma Samples for Padding Regions of Cube Faces

This clause specifies the semantics of the generation of luma samples for the padding regions of the coded cube faces.

offsetX is set equal to 0.5 and offsetY is set equal to 0.5.

The following applies for each packed padded cube face n in the range of 0 to 5, inclusive:

For each n-th packed padded cube face, the following applies:

PaddedFaceTop is set to coded_face_top[n]−cube_face_padding_size[n], PaddedFaceLeft is set to coded_face_top[n]−cube_face_padding_size[n], PaddedFaceWidth is set to coded_face_width[n+]2*cube_face_padding_size[n], PaddedFaceHeight is set to coded_face_height[n]+2*cube_face_padding_size[n].

The variables UnitFaceWidth, UnitFaceHeight, UnitFaceColumn and UnitFaceRow are set as following:

UnitFaceWidth = unit_cube_packing_width / 3
UnitFaceHeight = unit_cube_packing_height / 2
UnitFaceColumn = Floor(unit_face_left ÷ lw )
UnitFaceRow = Floor(unit_face_top ÷ lh )

The variable UnitFacePaddingWidth and UnitFacePaddingHeight are set as following:

```
if( transformType = = 0 | | transformType = = 1 | | transformType = = 2
| | transformType = = 3 ) {
    horRatio = projRegWidth ÷ packedRegWidth
    verRatio = projRegHeight ÷ packedRegHeight
} else if
( transformType = = 4 | | transformType = = 5 | | transformType = = 6 | |
    transformType = = 7 ) {
    horRatio = projRegWidth ÷ packedRegHeight
    verRatio = projRegHeight ÷ packedRegWidth
}
UnitFacePaddingWidth = horRatio * cube_face_padding size[ n ]
UnitFacePaddingHeight = verRatio * cube_face_padding size[ n ]
```

For each sample location (xCodedFace, yCodedFace) in the range of [PaddedFaceLeft, PaddedFaceLeft+PaddedFaceWidth] and [PaddedFaceLeft, PaddedFaceTop+PaddedFaceHeight], respectively, the following applies:

Process A.1.2.1.1.3 is called with xCodedFace, yCodedFace, PaddedFaceLeft, PaddedFaceTop, PaddedFaceWidth, PaddedFaceHeight and cube_face_padding_size[n] as inputs. The output is stored as isInFace.

If the value of isInFace is equal to 0 the following applies:
x is set equal to xCodedFace−coded_face left[n].
y is set equal to yCodedFace−coded_face_top[n].
Clause A.1.2.1.1.4 is invoked with x, y, coded_face width [n], coded_face_height[n], UnitFaceWidth, UnitFaceHeight, TransformType[n], offsetX and offsetY as inputs, and the output is assigned to sample location (hPos, vPos).
xUnitFace is set equal to unit_face_left[n]+hPos.
yUnitFace is set equal to unit_face_top[n]+vPos.
Clause A.1.2.1.1.5 is invoked with xUnitFace, yUnitFace, UnitFaceColumn, UnitFaceRow, UnitFaceWidth, UnitFaceHeight, UnitFacePaddingWidth, UnitFacePaddingHeight, pps_360_video_geometry_type as inputs and the output is assigned to position (xPos, yPos, zPos).
Clause A.1.2.1.1.6 is invoked with position (xPos, yPos, zPos), UnitFaceWidth, UnitFaceHeight as inputs and the output is assigned to (hPosSrcUnitFace, vPosSrcUnitFace).
faceSrcIdx is set to lookUpTab(UnitFaceColumnSrc, UnitFaceRowSrc).
x2 is set equal to hPosSrcUnitFace−unit_face_left[faceSrcIdx].
y2 is set equal to vPosSrcUnitFace−unit_face_top[faceSrcIdx].
Clause A.1.2.1.1.7 is invoked with (x2, y2), coded_face_width[n], coded_face_height[n], UnitFaceWidth, UnitFaceHeight, TransformType[n], offsetX and offsetY as inputs, and the output is assigned to (hPos3, vPos3).
hPosSrcCoded is set equal to hPos3+coded_face_left[faceSrcIdx].
vPosSrcCoded is set equal to vPos3+coded_face_top[faceSrcIdx].
Clause xxx is invoked with (hPosSrcCoded, vPosSrcCoded) as input and the output is assigned to the sample specified by (xCodedFace, yCodedFace).

A.1.2.1.2 Check if Position is Inside Cube Face or Padding Area

Inputs to this process are:
sample location (x, y) within the packed region, where x and y are in relative packed picture sample units, while the sample location is at an integer sample location within the packed picture,
The location (PaddedFaceLeft, PaddedFaceTop) and size (PaddedFaceWidth, PaddedFaceHeight) of the padded cube face, in relative packed picture sample units,
The size of the padding (FacePaddingSize)
Outputs of this process are:
A Boolean isInFace, indicating whether the sample location is inside the coded region of the face (isInFace==1) or inside the padding region of the face (isInFace==0).
The output is derived as follows:

```
if( x < PaddedFaceLeft + FacePaddingSize ||
    x >= PaddedFaceWidth − FacePaddingSize ||
    y < PaddedFaceTop + FacePaddingSize ||
    y >= PaddedFaceHeight − FacePaddingSize ) {
    isInFace = 0
}
else {
    isInFace = 1
}
```

A.1.2.1.3 Conversion of Sample Locations from Coded Cube Face Cords to Unit Cube Face Coords Inputs to this process are:
sample location (x, y) within the packed region, where x and y are in relative packed picture sample units, while the sample location is at an integer sample location within the packed picture,
the width and the height (projRegWidth, projRegHeight) of the projected region, in relative projected picture sample units,
the width and the height (packedRegWidth, packedRegHeight) of the packed region, in relative packed picture sample units,
transform type (transformType), and
offset values for the sampling position (offsetX, offsetY) in the range of 0, inclusive, to 1, exclusive, in horizontal and vertical relative packed picture sample units, respectively.
NOTE—offsetX and offsetY both equal to 0.5 indicate a sampling position that is in the centre point of a sample in packed picture sample units.
Outputs of this process are:
the centre point of the sample location (hPos, vPos) within the projected region in relative projected picture sample units, where hPos and vPos may have non-integer real values.

The outputs are derived as follows:
```
if( transformType = = 0 | | transformType = = 1 | | transformType = = 2 | | transformTy
pe = = 3 ) {
    horRatio = projRegWidth ÷ packedRegWidth
    verRatio = projRegHeight ÷ packedRegHeight
```

```
} else if ( transformType = = 4 | | transformType = = 5 | | transformType = = 6 | |
    transformType = = 7 ) {
    horRatio = projRegWidth ÷ packedRegHeight
    verRatio = projRegHeight ÷ packedRegWidth
}
if( transformType = = 0 ) {
    hPos = horRatio * ( x + offsetX )
    vPos = verRatio * ( y + offsetY )
} else if ( transformType = = 1 ) {
    hPos = horRatio * ( packedRegWidth − x − offsetX )
    vPos = verRatio * ( y + offsetY )
} else if ( transformType = = 2 ) {
    hPos = horRatio * ( packedRegWidth − x − offsetX )
    vPos = verRatio * ( packedRegHeight − y − offsetY )   (D-59)
} else if ( transformType = = 3 ) {
    hPos = horRatio * ( x + offsetX )
    vPos = verRatio * ( packedRegHeight − y − offsetY )
} else if ( transformType = = 4 ) {
    hPos = horRatio * ( y + offsetY )
    vPos = verRatio * ( x + offsetX )
} else if ( transformType = = 5 ) {
    hPos = horRatio * ( y + offsetY )
    vPos = verRatio * ( packedRegWidth − x − offsetX )
} else if ( transformType = = 6 ) {
    hPos = horRatio * ( packedRegHeight − y − offsetY )
    vPos = verRatio * ( packedRegWidth − x − offsetX )
} else if ( transformType = = 7 ) {
    hPos = horRatio * ( packedRegHeight − y − offsetY )
    vPos = verRatio * ( x + offsetX )
}
```

A.1.2.1.4 Projection for One Sample Location to Face Plane of Unit Cube

Inputs to this process are:

the centre point of a sample location (hPos, vPos) along the horizontal and vertical axes, respectively, in relative projected picture sample units, where hPos and vPos may have non-integer real values.

UnitFaceColumn and UnitFaceRow, which specify the location of the unit face to which the sample location belongs.

UnitFaceWidth and UnitFaceHeight, which are the width and height, respectively, of a monoscopic projected luma cube face, in relative projected picture sample units, and UnitFacePaddingWidth and UnitFacePaddingHeight, which are the padding width and padding height, respectively, of a monoscopic projected luma cube face, in relative projected picture sample units, and geometryType, which shall specify the type of cube based coding geometry, which is used. Values of geometryType are stated in xxx. And Outputs of this process are:

relative cube coordinates (x, y, z) for the sample location along the x-, y- and z-axes, respectively, in relative projected picture sample units, where x, y and z may have non-integer real values.

The projection for a sample location is derived as follows:

```
lw = UnitFaceWidth + 2 * UnitFacePaddingWidth
lw_noPadding = UnitFaceWidth
lh = UnitFaceHeight + 2 * UnitFacePaddingHeight
lh_noPadding = UnitFaceHeight
w = UnitFaceColumn
h = UnitFaceWidthRow
/* conversion to face cords ranging from −1.0 to 1.0, however, since we are in the padding
region we will be outside these */
tmpHorVal = hPos − w * lw − paddingSize
tmpVerVal = vPos − h * lh − paddingSize
hPos' = −( 2 * tmpHorVal ÷ lw_noPadding) + 1
vPos' = −( 2 * tmpVerVal ÷ lh_noPadding) + 1
/* adjustment of distance between samples */
if( geometryType = = HEC ) {
    t = 1.0 + 0.4 * (1.0− hPos' * hPos') * (1.0− vPos' * vPos')
    hPos" = stan(hPos' *S_PI / 4.0)
    if( ( w = = 2 && h = = 1 ) || ( w = = 0 && h = = 1 ) ) { /* top face or bottom
face */
        vPos" = stan(vPos' *S_PI / 4.0)
    }
    else {
        vPos" = vPos' / t
    }
}
else if(geometryType = = EAC ) {
    hPos" = stan(hPos' * S_PI / 4.0 )
    vPos" = stan(vPos' * S_PI / 4.0 )
}
```

```
else { /* geometryType = = CMP */
  hPos" = hPos'
  vPos" = vPos'
}
/* mapping to unit cube coordinates */
if( w = = 1 && h = = 0 ) { /* positive x front face */
  x = 1.0
  y = hPos"
  z = vPos"
} else if( w = = 1 && h = = 1 ) { /* negative x back face */
  x = -1.0
  y = -vPos"
  z = -hPos"
} else if( w = = 2 && h = = 1 ) { /* positive z top face */ (D-57)
  x = -hPos"
  y = -vPos"
  z = 1.0
} else if( w = = 0 && h = = 1 ) { /* negative z bottom face */
  x = hPos"
  y = -vPos"
  z = -1.0
} else if( w = = 0 && h = = 0 ) { /* positive y left face */
  x = -hPos"
  y = 1.0
  z = vPos"
} else { /* ( w = = 2 && h = = 0 ), negative y right face */
  x = hPos"
  y = -1.0
  z = vPos"
}
```

A.1.2.1.5 Projection for a Relative Cube Coordinate to One Relative Projected Picture Sample Location Inputs to this process are:

relative cube coordinates (xPos, yPos, zPos) for the sample location along the x-, y- and z-axes, respectively, in relative projected picture sample units, where xPos, yPos and zPos may have non-integer real values.

UnitFaceWidth and UnitFaceHeight, which are the width and height, respectively, of a monoscopic projected luma cube face, in relative projected picture sample units.

Outputs of this process are:

the centre point of a sample location (hPos, vPos) along the horizontal and vertical axes, respectively, in relative projected picture sample units, where hPos and vPos may have non-integer real values.

The projection for a sample location is derived as follows:

```
aX = abs(xPos)
aY = abs(yPos)
aZ = abs(zPos)
if( aX >= aY && aX >= aZ ) {
  if( xPos > 0 ) {
    w = 1
    h = 0
    hPos" = -zPos / aX
    vPos" = -yPos / aX
  }
  else {
    w = 1
    h = 1
    hPos" = zPos / aX
    vPos" = -yPos / aX
  }
}
else if( aY >= aX && aY >= aZ ) {
  if( yPos > 0 ) {
    w = 0
    h = 1
    hPos" = xPos / aY
    vPos" = zPos / aY
  }
```

```
    else {
      w = 2
      h = 1
      hPos" = xPos / aY
      vPos" = -zPos / aY
    }
  }
  else {
    if( zPos > 0 ) {
      w = 0
      h = 0
      hPos" = xPos / aZ
      vPos" = -yPos / aZ
    }
    else {
      w = 2
      h = 0
      hPos" = -xPos / aZ
      vPos" = -yPos / aZ
    }
  }
}
/* adjustment of distance between samples */
if( geometryType = = HEC ) {
  hPos' = 4.0 / S_PI*satan(hPos")
  if( ( w = = 2 && h = = 1 ) || ( w = = 0 && h = = 1 ) ) { /* top face or bottom face */
    vPos' = 4.0 / S_PI * satan( vPos" )
  }
  else {
    t = 0.4 * vPos" * (hPos"*hPos"-1.0)
    vPos' = sfabs(t) < S_EPS ? vPos" : (1.0 - ssqrt(1.0-4.0*t*(vPos"-t))) / (2.0 * t)
  }
}
else if(geometryType = = EAC ) {
  hPos' = 4.0 / S_PI * satan( hPos" )
  vPos' = 4.0 / S_PI * satan( vPos" )
}
else { /* geometryType = = CMP */
  hPos' = hPos"
  vPos' = vPos"
}
/* conversion from face cords ranging from -1.0 to 1.0, to cords scaled to unit face width/
height*/
// convert hPos', vPos' to [0, width], [0, height]
tmpHorVal = (( hPos' + 1.0 ) * ( UnitFaceWidth >> 1 ) + ( -0.5 ))
tmpVerVal = (( vPos' + 1.0 ) * ( UnitFaceHeight >> 1 ) + (-0.5))
hPos = w * UnitFaceWidth + tmpHorVal
vPos = h * UnitFaceHeight + tmpVerVal
```

A.1.2.1.6 Conversion of Sample Locations from Unit Cube Face Cords to Coded Cube Face Coords Inputs to this process are:

the centre point of the sample location (hPos, vPos) within the projected region in relative projected picture sample units, where hPos and vPos may have non-integer real values.

the width and the height (projRegWidth, projRegHeight) of the projected region, in relative projected picture sample units, the width and the height (packedRegWidth, packedRegHeight) of the packed region, in relative packed picture sample units, transform type (transformType), and offset values for the sampling position (offsetX, offsetY) in the range of 0, inclusive, to 1, exclusive, in horizontal and vertical relative packed picture sample units, respectively.

NOTE—offsetX and offsetY both equal to 0.5 indicate a sampling position that is in the centre point of a sample in packed picture sample units.

Outputs of this process are:

sample location (x, y) within the packed region, where x and y are in relative packed picture sample units The outputs are derived as follows:

```
if( transformType = = 0 || transformType = = 1 || transformType = = 2 || transformType = = 3 ) {
  horRatio = packedRegWidth ÷ projRegWidth
  verRatio = packedRegHeight ÷ projRegHeight
} else if ( transformType = = 4 || transformType = = 5 || transformType = = 6 || transformType = = 7 ) {
  horRatio = packedRegHeight ÷ projRegWidth
  verRatio = packedRegWidth ÷ projRegHeight
}
```

```
if( transformType = = 0 ) {
   x = horRatio * ( hPos) + offsetX
   y = verRatio * ( vPos ) + offsetY
} else if ( transformType = = 1 ) {
   x = horRatio * ( packedRegWidth − hPos) − offsetX
   y = verRatio * ( vPos) + offsetY
} else if ( transformType = = 2 ) {
   x = horRatio * ( packedRegWidth − hPos) − offsetX
   y = verRatio * ( packedRegHeight − vPos ) − offsetY    (D-59)
} else if ( transformType = = 3 ) {
   x = horRatio * ( hPos) + offsetX
   y = verRatio * ( packedRegHeight − vPos) − offsetY
} else if ( transformType = = 4 ) {
   x = horRatio * ( vPos ) + offsetY
   y = verRatio * ( hPos ) + offsetX
} else if ( transformType = = 5 ) {
   x = horRatio * ( packedRegHeight − vPos) − offsetY
   y = verRatio * ( hPos ) + offsetX
} else if ( transformType = = 6 ) {
   x = horRatio * ( packedRegHeight − vPos ) − offsetY
   y = verRatio * ( packedRegWidth − hPos ) − offsetX
} else if ( transformType = = 7 ) {
   x = horRatio * ( vPos ) + offsetY
   y = verRatio * ( packedRegWidth − hPos ) − offsetX
}
```

An efficient method of signaling uncoded regions in the picture buffer using "uncoded" slices. The regions are used for the generation of additional data, which can be used for prediction or loop filtering purposes. This allows a very simple implementation and description of secondary tools, which would otherwise have to be implemented at a block level.

Figure 13A:
FIG. 13A is an example for partitioning with tiles.
Figure 13B:
FIG. 13B is an example for partitioning with tiles applying the geometry padding using "uncoded" tiles.

FIG. 13A is an example for partitioning with tiles without applying the geometry padding using "uncoded" tiles. While FIG. 13B is an example for partitioning with tiles applying the geometry padding using "uncoded" tiles. Comprising FIG. 13B to FIG. 13A, the embodiments of this invention allow to significantly reduce the seam artifact issue without changes at block level.

An embodiment of the invention comprises or is a computer program comprising program code for performing any of the methods described herein, when executed on a computer.

An embodiment of the invention comprises or is a computer readable medium comprising a program code that, when executed by a processor, causes a computer system to perform any of the methods described herein.

The person skilled in the art will understand that the "blocks" ("units") of the various figures represent or describe functionalities of embodiments of the invention (rather than necessarily individual "units" in hardware or software) and thus describe equally functions or features of apparatus embodiments as well as method embodiments (unit equaling step).

As explained above, the arrangements for image coding may be implemented in hardware, such as the video encoding apparatus or video decoding apparatus as described above, or as a method. The method may be implemented as a computer program. The computer program is then executed in a computing device.

The apparatus, such as video decoding apparatus, video encoding apparatus or any other corresponding image coding apparatus is configured to perform one of the methods described above. The apparatus comprises any necessary hardware components. These may include at least one processor, at least one memory, at least one network connection, a bus and similar. Instead of dedicated hardware components it is possible to share, for example, memories or processors with other components or access at a cloud service, centralized computing unit or other resource that can be used over a network connection.

Depending on certain implementation requirements of the inventive methods, the inventive methods can be implemented in hardware or in software or in any combination thereof.

The implementations can be performed using a digital storage medium, in particular a floppy disc, CD, DVD or Blu-Ray disc, a ROM, a PROM, an EPROM, an EEPROM or a Flash memory having electronically readable control signals stored thereon which cooperate or are capable of cooperating with a programmable computer system such that an embodiment of at least one of the inventive methods is performed.

A further embodiment of the present disclosure is or comprises, therefore, a computer program product with a program code stored on a machine-readable carrier, the program code being operative for performing at least one of the inventive methods when the computer program product runs on a computer.

In other words, embodiments of the inventive methods are or comprise, therefore, a computer program having a program code for performing at least one of the inventive methods when the computer program runs on a computer, on a processor or the like.

A further embodiment of the present disclosure is or comprises, therefore, a machine-readable digital storage medium, comprising, stored thereon, the computer program operative for performing at least one of the inventive methods when the computer program product runs on a computer, on a processor or the like.

A further embodiment of the present disclosure is or comprises, therefore, a data stream or a sequence of signals representing the computer program operative for performing at least one of the inventive methods when the computer program product runs on a computer, on a processor or the like.

A further embodiment of the present disclosure is or comprises, therefore, a computer, processor or any other programmable logic device adapted to perform at least one of the inventive methods.

A further embodiment of the present disclosure is or comprises, therefore, a computer, processor or any other programmable logic device having stored thereon the computer program operative for performing at least one of the inventive methods when the computer program product runs on the computer, processor or the any other programmable logic device, e.g., a FPGA (Field Programmable Gate Array) or an ASIC (Application Specific Integrated Circuit).

While the aforegoing was particularly shown and described with reference to particular embodiments thereof, it is to be understood by those skilled in the art that various other changes in the form and details may be made, without departing from the spirit and scope thereof. It is therefore to be understood that various changes may be made in adapting to different embodiments without departing from the broader concept disclosed herein and comprehended by the claims that follow.

What is claimed is:

1. A device for encoding a picture, comprising:
   a processor; and
   a memory coupled to the processor and having processor-executable instructions stored thereon, which when executed cause the device to:
   partition the picture into one or more slices, each slice comprising one or more tiles, and one or more slices holding coded picture data, wherein the one or more slices holding coded picture data form a subpicture, the subpicture covering a rectangular region of the picture; and
   encode the one or more slices holding coded picture data,
   wherein the picture is a 360° video and the instructions further cause the device to:
   reconstruct samples of the picture of the 360° video in accordance with a projection format to obtain a set of 2D faces, wherein each 2D face is formed by one or more slices holding coded picture data, wherein at least a left boundary and a top boundary of a subpicture, respectively, is a boundary to a slice not holding coded picture data or is a boundary to another subpicture or is a picture boundary.

2. The device according to claim 1, wherein:
   in response to at least one tile in a given slice holding coded picture data, the whole given slice holds coded picture data.

3. The device according to claim 1, wherein:
   the one or more slices are formed rectangular.

4. The device according to claim 1, wherein:
   the picture is partitioned into a plurality of slices, and
   the one or more slices do not hold coded picture data.

5. The device according to claim 4, wherein:
   in response to at least one tile in a given slice not holding coded picture data, the whole given slice does not hold coded picture data.

6. The device according to claim 4, wherein;
   the one or more slices not holding coded picture data hold padding data for geometry padding.

7. The device according to claim 4, wherein:
   the one or more slices not holding coded picture data hold slice header data.

8. The device according to claim 4, wherein the instructions further cause the device to:
   disable in-loop filters at boundaries of slices not holding coded picture data.

9. The device according to claim 4, wherein the instructions further cause the device to:
   encode the one or more slices not holding coded picture data.

10. A device for decoding a picture, comprising:
    a processor; and
    a memory coupled to the processor and having processor-executable instructions stored thereon, which when executed cause the device to:
    partition the picture into one or more slices, each slice comprising one or more tiles, and one or more slices holding coded picture data, wherein the one or more slices holding coded picture data form a subpicture, the subpicture covering a rectangular region of the picture; and
    decode the one or more slices holding coded picture data,
    wherein the picture is a 360° video and the instructions further cause the device to:
    reconstruct samples of the picture of the 360° video in accordance with a projection format to obtain a set of 2D faces, wherein each 2D face is formed by one or more slices holding coded picture data, wherein at least a left boundary and a top boundary of a subpicture, respectively, is a boundary to a slice not holding coded picture data or is a boundary to another subpicture or is a picture boundary.

11. The device according to claim 10, wherein:
    in response to at least one tile in a given slice holding coded picture data, the whole given slice holds coded picture data.

12. The device according to claim 10, wherein:
    the one or more slices are formed rectangular.

13. The device according to claim 10, wherein:
    the picture is partitioned into a plurality of slices, and
    the one or more slices do not hold coded picture data.

14. The device according to claim 13, wherein:
    in response to at least one tile in a given slice not holding coded picture data, the whole given slice does not hold coded picture data.

15. The device according to claim 13, wherein;
    the one or more slices not holding coded picture data hold padding data for geometry padding.

16. The device according to claim 13, wherein:
    the one or more slices not holding coded picture data hold slice header data.

17. The device according to claim 13, wherein the instructions further cause the device to:
    receive, from a device for encoding the picture, information about a reserved buffer space for the picture in a picture buffer;
    wherein the reserved buffer space does not hold coded picture data.

18. The device according to claim 13, wherein the instructions further cause the device to:
    receive information for decoding originating from a device for encoding the picture, wherein the one or more slices not holding coded picture data are omitted from the information for the decoding.

19. The device according to claim 13, wherein the instructions further cause the device to:
    disable in-loop filters at boundaries of slices not holding coded picture data.

20. A method for encoding a picture, wherein the method is applied to an encoding apparatus and comprises:
    partitioning the picture into one or more slices, each slice comprising one or more tiles, and one or more slices holding coded picture data, wherein the one or more slices holding coded picture data form a subpicture, the subpicture covering a rectangular region of the picture; and encoding the one or more slices holding coded picture data, wherein the picture is a 360° video and the method further comprises:

reconstructing samples of the picture of the 360° video in accordance with a projection format to obtain a set of 2D faces, wherein each 2D face is formed by one or more slices holding coded picture data, wherein at least a left boundary and a top boundary of a subpicture, respectively, is a boundary to a slice not holding coded picture data or is a boundary to another subpicture or is a picture boundary.

21. A method for decoding a picture, wherein the method is applied to a decoding apparatus and comprises:

partitioning the picture into one or more slices, each slice comprising one or more tiles, and one or more slices holding coded picture data, wherein the one or more slices holding coded picture data form a subpicture, the subpicture covering a rectangular region of the picture; and decoding the one or more slices holding coded picture data, wherein the picture is a 360° video and the instructions further cause the device to:

reconstruct samples of the picture of the 360° video in accordance with a projection format to obtain a set of 2D faces, wherein each 2D face is formed by one or more slices holding coded picture data, wherein at least a left boundary and a top boundary of a subpicture, respectively, is a boundary to a slice not holding coded picture data or is a boundary to another subpicture or is a picture boundary.

* * * * *